United States Patent
Becker et al.

(10) Patent No.: US 11,363,069 B1
(45) Date of Patent: Jun. 14, 2022

(54) SYSTEMS AND METHODS FOR MULTIPLE CUSTODY USING MOBILE DEVICES OR WEARABLES

(71) Applicant: Wells Fargo Bank, N.A., San Francisco, CA (US)

(72) Inventors: Laurie J. Becker, Newport News, VA (US); Shelly A. Carnazzo, Gretna, NE (US); Darren M. Goetz, Salinas, CA (US); Dennis E. Montenegro, Concord, CA (US); Janice R. Powell, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 250 days.

(21) Appl. No.: 16/712,562

(22) Filed: Dec. 12, 2019

(51) Int. Cl.
*H04L 29/06* (2006.01)
*H04L 9/40* (2022.01)

(52) U.S. Cl.
CPC .............. *H04L 63/20* (2013.01); *H04L 63/08* (2013.01); *H04L 63/10* (2013.01)

(58) Field of Classification Search
CPC .......... H04L 63/20; H04L 63/08; H04L 63/10
USPC ........................................................... 726/4
See application file for complete search history.

(56) References Cited

U.S. PATENT DOCUMENTS

| | | | |
|---|---|---|---|
| 9,299,206 B2 | 3/2016 | Angus et al. | |
| 9,949,124 B1 | 4/2018 | Chen | |
| 10,109,124 B2 | 10/2018 | Gilbertson et al. | |
| 10,237,070 B2 | 3/2019 | Lindemann | |
| 10,269,010 B2 | 4/2019 | Tunnell et al. | |
| 2003/0163577 A1* | 8/2003 | Moon | H04L 63/0272 709/229 |
| 2016/0364553 A1* | 12/2016 | Smith | H04L 63/0435 |
| 2017/0032341 A1 | 2/2017 | Johnsrud | |
| 2019/0044942 A1 | 2/2019 | Gordon et al. | |

OTHER PUBLICATIONS

FDIC Regulations—Internal Routine and Controls Section 4.2. Mar. 2015. 26 pages.

* cited by examiner

*Primary Examiner* — Longbit Chai
(74) *Attorney, Agent, or Firm* — Foley & Lardner LLP

(57) ABSTRACT

A system including a network interface and a processing circuit is provided. The processing circuit includes one or more processors coupled to non-transitory memory. The processing circuit is structured to receive a request for a multiple custody linkage between user devices. The multiple custody linkage includes a digital connection between the user devices that allows shared access to a resource. The resource includes at least one of a physical object or information. The processing circuit is further structured to perform a validation process based on information in the request for the multiple custody linkage to determine if a violation of a security protocol exists. The security protocol is associated with security of the resource. The processing circuit is further structured to, in response to determining no violation of the security protocol exists, activate the multiple custody linkage between the user devices to allow the shared access to the resource.

20 Claims, 6 Drawing Sheets

US 11,363,069 B1

SYSTEMS AND METHODS FOR MULTIPLE CUSTODY USING MOBILE DEVICES OR WEARABLES

TECHNICAL FIELD

The present disclosure relates generally to systems and methods for accessing secure resources via multiple custody linkages using mobile devices or wearables.

BACKGROUND

Institutions (e.g., financial institutions, government institutions, academic institutions, etc.) often have resources (e.g., information, files, assets, etc.) that are not readily accessible for security purposes. Accessing said resources often requires human interaction. However, any actions that require human interaction are susceptible to bad actors that may attempt to circumvent security protocols. For example, employees of an institution may have authorization to access certain resources which can present inherent security risks.

To mitigate some security risks associated with accessing resources, institutions frequently incorporate manually intensive security protocols for allowing individuals access to the resources. For example, institutions may incorporate physical keys to access certain areas, paper logs of interactions between individuals and the institution, etc. However, these manual security protocols may take a significant amount of time out of employees' days and are susceptible to manipulation.

SUMMARY

One embodiment of the disclosure relates to a system including a network interface and a processing circuit. The processing circuit includes one or more processors coupled to non-transitory memory. The processing circuit is structured to receive a request for a multiple custody linkage between user devices. The multiple custody linkage includes a digital connection between the user devices that allows shared access to a resource. The resource includes at least one of a physical object or information. The processing circuit is further structured to perform a validation process based on information in the request for the multiple custody linkage to determine if a violation of a security protocol exists. The security protocol is associated with security of the resource. The processing circuit is further structured to, in response to determining no violation of the security protocol exists, activate the multiple custody linkage between the user devices to allow the shared access to the resource.

Another embodiment may be a computer-implemented method. The method includes receiving, by an institution computing system, a request for a multiple custody linkage between user devices. The multiple custody linkage includes a digital connection between the user devices that allows shared access to a resource. The resource includes at least one of a physical object or information. The method further includes performing, by the institution computing system, a validation process based on information in the request for the multiple custody linkage to determine if a violation of a security protocol exists. The security protocol is associated with security of the resource. The method further includes, in response to determining no violation of the security protocol exists, activating, by the institution computing system, the multiple custody linkage between the user devices to allow the shared access to the resource.

Another embodiment may be a computer-implemented method. The method includes linking, by a first user device, the first user device with a second user device. The method includes generating, by the first user device, a request for a multiple custody linkage between the first user device and the second user device. The multiple custody linkage includes a digital connection between the first user device and the second user device that allows shared access to a resource. The resource includes at least one of a physical object or information. The method further includes transmitting, by the first user device, the request to an institution computing system. The method further includes receiving, by the first user device, a notification indicating whether the request is approved or denied.

DETAILED DESCRIPTION

Figure 1A:
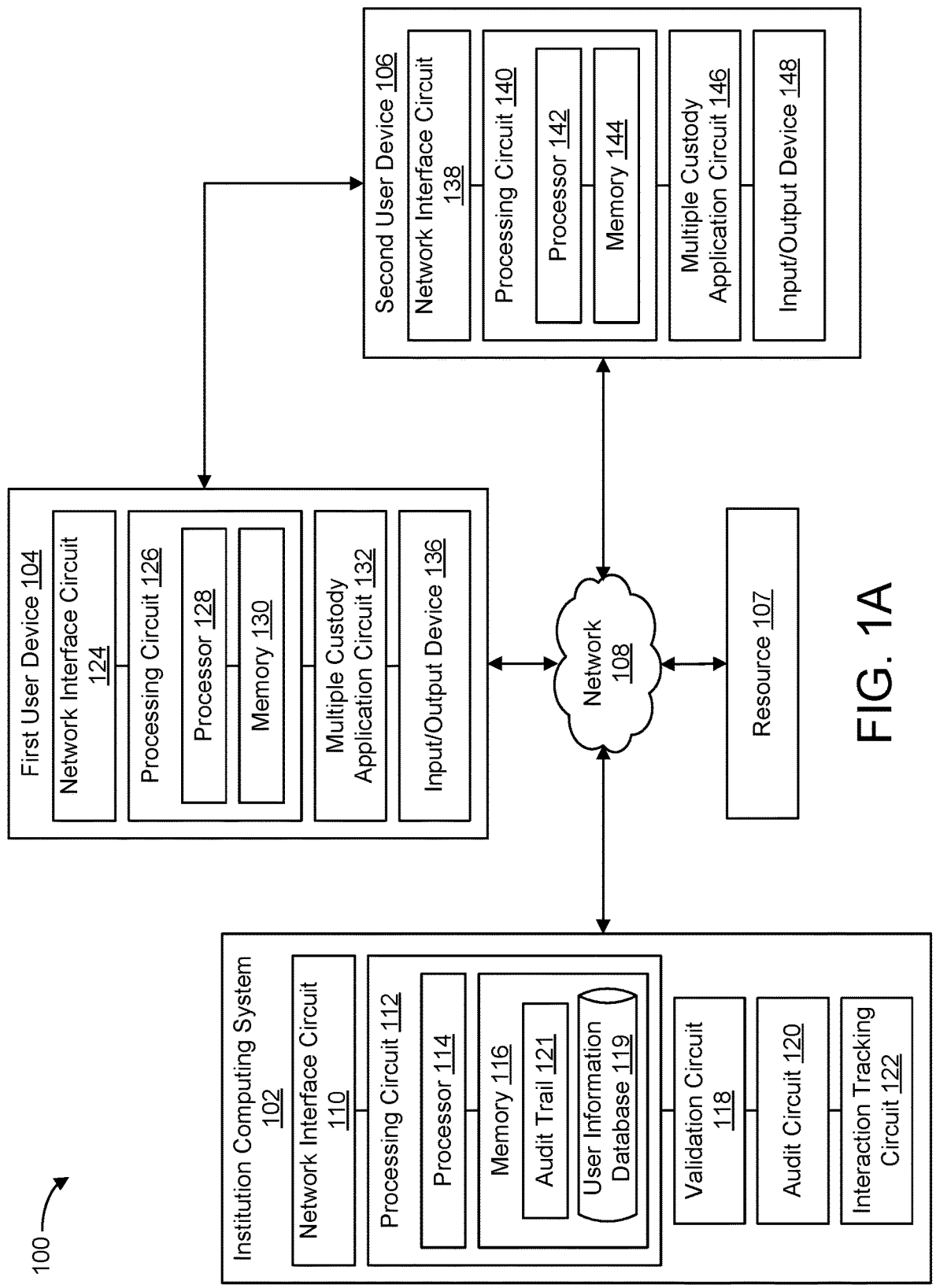
FIG. 1A is a block diagram of a multiple custody management system including an institution computing system, according to some embodiments.

Referring generally to the FIGURES, systems and methods for providing access to resources via multiple custody linkages using mobile devices and/or wearables are shown and described, according to some embodiments. As described herein, multiple custody can refer to a security procedure requiring two or more users cooperating to gain authorized access to a resource (e.g., information, data, assets, devices, an area, etc.). A resource, as defined herein, can refer to anything (e.g., physical objects, information/data, etc.) that requires an established multiple custody linkage among user devices to access. A common form of multiple custody is dual custody wherein two users work together to gain authorized access to a resource. Dual custody can be facilitated by linking two user devices together to ensure two users are actively participating in the dual custody. However, depending on a level of security desired for a particular resource, triple custody, quadruple custody, etc. can be implemented to increase an overall level of security by requiring more individuals to participate in gaining authorized access to the resource.

In many systems, multiple custody is implemented through procedures that are manual in nature (e.g., using brass keys, paper logs, etc.) and require significant amounts of time for users to successfully implement. Further, manual implementations of multiple custody are prone to human error. As an example, in a financial institution, security personnel may be responsible for manually logging who accesses a vault. In the example, if an incorrect name of an employee who accesses the vault is recorded and a security breach of the vault occurs, the wrong employee may be held responsible for the security breach. The risk of human error is thereby compounded by the fact that an institution must pay an individual to perform the manual recordation.

To reduce a number of manual steps that must be taken in multiple custody scenarios, devices such as mobile devices or wearables can be utilized. It should be noted that wearables may be used interchangeably with the term "wearable devices" herein. Wearable devices can refer to any type of device that an individual wears including, but not limited to, a watch (e.g., a smart watch), glasses (e.g., eye glasses, sunglasses, smart glasses), bracelets (e.g., a smart bracelet), etc. Mobile devices may include any type of mobile device including, but not limited to, a phone (e.g., smart phone), a tablet, a personal digital assistant, a smart badge, etc. In some embodiments, mobile devices include other portable computing devices such as, for example, laptops. In some embodiments, the term "user devices" may be used herein to refer generally to mobile devices and/or wearable devices. Accordingly, interactions between user devices may include interactions between mobile devices, interactions between wearables, interactions between mobile devices and wearables, etc.

User devices can be helpful in multiple custody scenarios as a result of configurable functionality to maximize efficiency, security, and accuracy among other benefits. In particular, unique capabilities of user devices can be leveraged such as, for example, wireless connectivity, proximity technology, sensors, biometrics, etc. These capabilities can be used in tandem with applications and servers designed for supporting multiple custody. In some embodiments, applications that facilitate multiple custody scenarios are installed on the user devices.

As described in greater detail below, a multiple custody linkage can be established between two or more user devices (e.g., between multiple smart phones, between a smart phone and a smart watch, etc.) to enable authorized access to a resource. A multiple custody linkage can refer to any digital connection between devices to enable multiple custody procedures. A multiple custody linkage may be transient and only enable multiple custody procedures via digital means during a life cycle of the linkage. In this way, after the linkage has been severed, a resource accessible during the linkage may become inaccessible.

Referring now to FIG. 1A, a block diagram of a multiple custody management system 100 is shown, according to some embodiments. Multiple custody management system 100 can allow users to establish multiple custody linkages in order to access a resource. Multiple custody management system 100 can include, among other systems/devices, an institution computing system 102, a first user device 104, a second user device 106, and a resource 107. Institution computing system 102 is shown to be communicatively and operatively coupled to first user device 104, second user device 106, and resource 107 over a network 108. Network 108 can provide communicable and operative coupling between institution computing system 102, first user device 104, second user device 106, resource 107, and/or other components disclosed and described herein to provide and facilitate the exchange of communications (e.g., data, instructions, messages, values, commands, etc.). Accordingly, network 108 may include any network including wired (e.g., Ethernet) and/or wireless networks (e.g., 802.11X, ZigBee, Bluetooth, WiFi, etc.). In some embodiments, network 108 includes the Internet. In some embodiments, network 108 includes a proprietary network (e.g., a proprietary banking network) to provide secure or substantially secure communications.

It should be noted that, as shown in FIG. 1A, multiple custody management system 100 includes two user devices (i.e., first user device 104 and second user device 106) and therefore may be described below in the context of dual custody. However, multiple custody management system 100 can facilitate any extension of multiple custody (e.g., triple custody, quadruple custody, etc.) by increasing an amount of user devices that are involved in a multiple custody linkage.

Multiple custody management system 100 is shown to include resource 107. Resource 107 can be any type of resource that requires a multiple custody between user devices in order to be accessible. Specifically, resource 107 may require that at least two users are involved in a valid multiple custody linkage before resource 107 "unlocks" (i.e., allows access for the users). Resource 107 may include, for example, information/data stored on storage devices (e.g., hard drives, solid state drives (SSDs), etc.), assets (e.g., equipment, cash, gold, devices, etc.), secure locations within a building (e.g., vaults), etc. Depending on the type of resource, resource 107 may have different requirements for becoming and staying accessible for users via multiple custody. For example, if resource 107 is a secure room within a building, the secure room may require that two users scan their respective user devices (e.g., smart badges, smart phones, etc.) at an entry point to the secure room and may further require that the user devices are both in the secure room for the duration of a multiple custody linkage. As another example, if resource 107 includes data stored on a server accessible via a computer, the computer may require that two user devices associated with independent users are within a predefined distance (e.g., 1 foot, 2 feet, etc.) of the computer for a duration of a multiple custody linkage to access the data. Accordingly, requirements for accessing resource 107 can be customized and configurable depending on a level of security desired and what technology is available for monitoring multiple custody scenarios.

In some embodiments, requirements to access resource 107 are scaled respective to or dependent on an estimated security risk associated with resource 107 being compromised. For example, if resource 107 is box with $10,000 inside, the requirements may be more lenient as compared to if resource 107 is a box with $1,000,000 inside. In the example, the vault storing $10,000 may only require dual custody whereas the vault storing $1,000,000 may have a higher associated security risk, and therefore may require a higher degree of multiple custody (e.g., triple custody, quadruple custody, etc.). In some embodiments, requirements to access resource 107 are managed and maintained by institution computing system 102 as described in greater detail below.

Multiple custody management system 100 is shown to include first user device 104. First user device 104 can be any type of computing device associated with a first user. The first user can use first user device 104 to initiate a multiple custody linkage with other user devices (e.g., second user device 106) to gain authorized access to resource 107. In this regard, first user device 104 may include any wearable or non-wearable device. As described above, wearable devices can refer to any type of device that an individual wears including, but not limited to, a watch (e.g., a smart watch), glasses (e.g., eye glasses, sunglasses, smart glasses), bracelets (e.g., a smart bracelet), etc. First user device 104 may also include any type of mobile device including, but not limited to, a phone (e.g., smart phone), a tablet, a personal digital assistant, a laptop, etc.

As shown in FIG. 1A, first user device 104 can include a network interface circuit 124 that enables first user device 104 to exchange information over network 108, a processing circuit 126, and an input/output (I/O) device 136. Network interface circuit 124 can include program logic that facilitates connection of first user device 104 to network 108. Network interface circuit 124 can support communication between first user device 104 and other systems, such as institution computing system 102. For example, network interface circuit 124 can include a cellular modem, a Bluetooth transceiver, a Bluetooth beacon, a radio-frequency identification (RFID) transceiver, and/or a near-field communication (NFC) transmitter. In some embodiments, network interface circuit 124 includes the hardware and machine-readable media sufficient to support communication over multiple channels of data communication. In some embodiments, network interface circuit 124 includes cryptography capabilities to establish a secure or relatively secure communication session between first user device 104 and institution computing system 102, second user device 106, and/or resource 107. In this regard, information related to multiple custody linkages may be encrypted and transmitted to prevent or substantially prevent a threat of hacking.

Processing circuit 126 is shown to include a processor 128 and memory 130. Processor 128 may be implemented as one or more application specific integrated circuits (ASICs), field programmable gate arrays (FPGAs), a group of processing components, or other suitable electronic processing components. Memory 130 may be one or more devices (e.g., RAM, ROM, Flash memory, hard disk storage) for storing data and/or computer code for completing and/or facilitating the various processes described herein. Memory 130 may be or include non-transient volatile memory, non-volatile memory, and non-transitory computer storage media. Memory 130 may include database components, object code components, script components, or any other type of information structure for supporting the various activities and information structures described herein. Memory 130 may be communicably coupled to processor 128 and include computer code or instructions for executing one or more processes described herein.

First user device 104 is shown to include a multiple custody application circuit 132. Multiple custody application circuit 132 can allow first user device 104 to be involved in multiple custody linkages and can otherwise facilitate multiple custody linkages on first user device 104. In some embodiments, multiple custody application circuit 132 is structured to provide displays to first user device 104 (e.g., via I/O device 136 described in greater detail below) such that the first user can interact with multiple custody scenarios. In some embodiments, multiple custody application circuit 132 may provide an application/website (e.g., a multiple custody application, a multiple custody website, etc.) for the first user to interact with. In some embodiments, multiple custody application circuit 132 may be downloaded as software by first user device 104 prior to its usage and hard-coded into memory 130. In some embodiments, multiple custody application circuit 132 is implanted via a web browser as a web-based interface application. In some embodiments, multiple custody application circuit 132 includes an application programming interface (API) and/or a software development kit (SDK) that facilitate the integration of other applications with multiple custody application circuit 132.

In some embodiments, multiple custody application circuit 132 includes logic to allow the first user to initiate and manage multiple custody linkages to access resource 107. Specifically, the first user can interact with multiple custody application circuit 132 via I/O device 136. I/O device 136 can include hardware and associated logics that enable the first user to exchange information with first user device 104. An input component of I/O device 136 can allow the first user to provide information to first user device 104. The input component may include various hardware and associated logics such as, for example, a mechanical keyboard, a mechanical mouse, a touchscreen, a microphone, a camera, a fingerprint scanner, etc. Likewise, an output component of I/O device 136 can include hardware and associated logics that allow first user device 104 to provide information to the first user. For example, the output component may include a digital display, a speaker, illuminating icons, LEDs, a vibration motor, etc. In this way, the first user can interact with multiple custody application circuit 132. For example, the first user may select a button via a touchscreen of I/O device 136 to initiate a multiple custody linkage and can be provided with instructions to complete the multiple custody linkage on a digital display component of I/O device 136.

Multiple custody management system 100 is also shown to include second user device 106. Second user device 106 can be used by a second user for facilitating multiple custody linkages for accessing resource 107. Second user device 106 may be similar to and/or the same as first user device 104. Accordingly, second user device 106 is shown to include a network interface circuit 138, a processing circuit 140, a processor 142, memory 144, a multiple custody application circuit 146, and an I/O device 148 which may be similar to and/or the same as network interface circuit 124, processing circuit 126, processor 128, memory 130, multiple custody application circuit 132, and I/O device 136, respectively. In some embodiments, multiple custody management system 100 includes more user devices in addition to first user device 104 and second user device 106 to facilitate higher degrees of multiple custody (e.g., triple custody, quadruple custody, etc.). However, multiple custody management system 100 is shown to include two user devices for ease of explanation.

In some embodiments, instead of or in addition to second user device 106, a robot is utilized for multiple custody linkages. If a robot is utilized in place of second user device 106, the robot may be responsible for automatically performing various tasks that may otherwise be performed by the second user associated with second user device 106. Incorporating a robot(s) in multiple custody management system 100 may provide additional security as the robot(s) can record all activity associated with resource 107. Further, the robot(s) may not have malicious intent or be susceptible to collusion. If the robot is utilized, the first user may establish a linkage between the robot and first user device 104 such that the first user and the robot can collaborate on a multiple custody activity. Accordingly, it should be appreciated that actions performed by the second user as described below can be replaced and/or supplemented by robots for additional security in multiple custody management system 100.

To initiate a multiple custody linkage to access resource 107, the first user may, for example, open a multiple custody application maintained by multiple custody application circuit 132. In this case, each user device in multiple custody management system 100 (i.e., first user device 104 and second user device 106) may be required to have the multiple custody application installed for multiple custody linkages to be initiated. Via I/O device 136, the first user can select an option to link (e.g., by pressing a button) first user device 104 and second user device 106. A link between first user device 104 and second user device 106 can indicate that user devices 104 and 106 are digitally associated and are prepared for involvement in a multiple custody linkage.

In some embodiments, the first user is allowed to select what user or user device they desire to be linked with. For example, the first user may select the second user associated with second user device 106 for convenience due to the second user being physically nearby. In some embodiments, the first user indicates what resource they desire to access (e.g., resource 107) and the second user is automatically selected by institution computing system 102 for the multiple custody linkage. Automatic selection of the second user based on user selection of a resource may provide additional security to multiple custody management system 100 by reducing a risk of the first user selecting another user the first user is in collusion with. For example, the second user may be randomly selected from a pool of users that can participate in the multiple custody linkage. As another example, the second user may be automatically selected respective of resource is selected by the first user. For example, if the first user selects that they want to access a vault storing money, the second user may be automatically selected as a trusted manager who is associated with a high confidence for maintaining security in multiple custody management system 100.

The multiple custody application may require some and/or all user devices involved in a multiple custody linkage to enable various settings before allowing devices to be linked. For example, user devices 104 and 106 may be required to enable Bluetooth functionality, location tracking functionality, etc. By requiring certain settings to be enabled prior to linking devices (and throughout a duration of a multiple custody linkage), a higher level of security can be maintained by ensuring user devices 104 and 106 are trackable and can be monitored during the multiple custody linkage.

In some embodiments, multiple custody application circuit 132 includes shortcuts for allowing the first user to quickly initiate a linkage process. Shortcuts may save the first user additional time in initiating multiple custody linkages. In particular, the shortcuts may allow the first user to initiate a multiple custody linkage without requiring on-screen interface clicks via the multiple custody application. For example, multiple custody application circuit 132 may automatically initiate the linkage process responsive to first user device 104 and second user device 106 being bumped together. In this example, short range communication (e.g., near field communication (NFC)) may be utilized to detect the bump and initiate the linkage processing accordingly. Other examples of shortcuts may include physical actions that users can perform such as fist bumps, handshakes, coordinated gestures, etc. that can be tracked and monitored by user devices 104 and 106. As a specific example, user devices 104 and 106 may include gesture tracking modules that monitor the first and second user to determine if they do a coordinated gesture to initiate the multiple custody linkage. Responsive to the coordinated gesture, a determination can be made by multiple custody application circuits 132 and 146 to link user devices 104 and 106. Gesture-based shortcuts may be particularly useful if first user device 104 and/or second user device 106 are wearable devices.

If all requirements for linking first user device 104 and second user device 106 are satisfied, user devices 104 and 106 can be set to a pending linkage state. The pending linkage state may indicate that user devices 104 and 106 are prepared for a multiple custody linkage to unlock resource 107, but that the multiple custody linkage has not been fully authenticated. In some embodiments, while in the pending linkage state, all users may be required to move their respective user device within a predefined distance (e.g., within one inch, within one foot, etc.) of one another and/or within a predefined distance of resource 107. The predefined distance can be configurable and customizable dependent on a security risk associated with resource 107. For example, if resource 107 is associated with a high security risk, the predefined distance may be shorter (e.g., within inches) as compared to if resource 107 is associated with a low security risk, which may set the predefined distance to a longer distance (e.g., within multiple feet). In some embodiments, determining whether first user device 104 is within the predefined distance from resource 107 is based on a Bluetooth communication between a Bluetooth component of resource 107 (not shown) and a Bluetooth component of network interface circuit 124.

In some embodiments, other forms of verification can be utilized to ensure resource 107 can be safely unlocked. For example, resource 107 may display a quick response (QR) code or other barcode that first user device 104 and second user device 106 can scan. As another example, institution computing system 102 may dynamically generate a passcode and provide a first portion (e.g., a first half) of the passcode to first user device 104 and a second portion of the passcode to second user device 106. Based on the received passcodes, the first user and the second user can enter their respective portion of the passcode to a display component of resource 107. In some embodiments, users may automatically provide their passcodes to resource 107 via an NFC tap or similar close-range communication.

Once preliminary verification processes are satisfied (e.g., moving user device 104 and 106 within a predefined distance of resource 107, scanning QR codes or barcodes, entering passcodes, etc.), institution computing system 102 can be triggered (e.g., via network 108) to perform additional validation. Additional validation performed by institution computing system 102 can ensure that a multiple custody linkage between first user device 104 and second user device 106 does not pose a threat to resource 107.

Institution computing system 102 can be operated by any type of institution that may utilize multiple custody linkages to provide additional security for resources (e.g., resource 107). For example, a financial institution may operate institution computing system 102 to secure money/assets, areas with safety deposit boxes of customers, confidential financial information, etc. As another example, a government institution may operate institution computing system 102 to secure classified documents, individuals requiring protection, government tech, etc.

Institution computing system 102 is shown to include a network interface circuit 110 and a processing circuit 112. In some embodiments, network interface circuit 110 and processing circuit 112 are similar to and/or the same as network interface circuit 124 and processing circuit 126 of first user device 104, respectively. Accordingly, network interface circuit 110 can include program logic that facilitates connection of institution computing system 102 to network 108. Network interface circuit 110 can support communication between institution computing system 102 and other systems, such as first user device 104, second user device 106, and/or resource 107. For example, network interface circuit 110 can include a cellular modem, a Bluetooth transceiver, a Bluetooth beacon, a radio-frequency identification (RFID)

transceiver, and a near-field communication (NFC) transmitter. In some embodiments, network interface circuit 110 includes the hardware and machine-readable media sufficient to support communication over multiple channels of data communication. Further, in some embodiments, network interface circuit 110 includes cryptography capabilities to establish a secure or relatively secure communication session between institution computing system 102 and first user device 104, second user device 106, and/or resource 107. In this regard, information (e.g., data associated with multiple custody linkages) may be encrypted and transmitted to prevent or substantially prevent a threat of hacking.

Processing circuit 112 is shown to include a processor 114 and memory 116. Processor 114 may be implemented as one or more application specific integrated circuits (ASICs), field programmable gate arrays (FPGAs), a group of processing components, or other suitable electronic processing components. Memory 116 may be one or more devices (e.g., RAM, ROM, Flash memory, hard disk storage) for storing data and/or computer code for completing and/or facilitating the various processes described herein. Memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to processor 114 and include computer code or instructions for executing one or more processes described herein. In some embodiments, institution computing system 102 is a distributed computing system. In this case, institution computing system 102 may include multiple network interface circuits 110 and/or multiple processing circuits 112.

Institution computing system 102 is shown to include a validation circuit 118. Validation circuit 118 can be structured to validate multiple custody linkages to ensure security of resource 107 is maintained. In some embodiments, first user device 104, second user device 106, and/or resource 107 may transmit a request for a multiple custody linkage to institution computing system 102 (e.g., via network 108) indicating that user devices 104 and 106 are in a pending linkage state and require validation to unlock resource 107. Based on the request, validation circuit 118 can operate to validate various aspects of the multiple custody linkage to determine if resource 107 can be safely unlocked.

In some embodiments, requests for multiple custody linkages include user credentials associated with users. Specifically within the context of multiple custody management system 100, a request may include user credentials of the first user and the second user associated with first user device 104 and second user device 106, respectively. User credentials as described herein can include any information that may be useful in determining an identity of a user. For example, user credentials associated with a user may include information such as a username and password associated with the user, an employee identification number, a device identifier (e.g., a media access control (MAC) address) of a user device associated with the user, a social security number of the user, biometrics (e.g., fingerprint, deoxyribonucleic acid (DNA) samples, iris scans, etc.), or any other appropriate information that can be used to identify the user.

Based on the user credentials provided by first user device 104 and/or second user device 106, validation circuit 118 can compare values of the provided user credentials to user credentials stored in a user information database 119 of memory 116. User information database 119 can store information associated with users that can be referenced for verification of user credentials. For example, user information database 119 may store information such as user login information (e.g., usernames and passwords), user biometrics, device identifiers, security authorization levels of users, etc. Validation circuit 118 can compare the information stored in user information database 119 to the provided user credentials to determine if any discrepancies are present. In other words, validation circuit 118 can determine if any of the provided user credentials are inconsistent with the information stored in user information database 119. If the provided user credentials match the information stored in user information database 119, a determination can be made that users associated with a request for a multiple custody linkage do not pose an immediate threat to resource 107. However, if some provided user credentials do not match information stored in user information database 119, a security measure may be initiated. Security measures can include any actions to address security concerns. For example, if a device identifier in the provided user credentials is not the same as an expected device identifier (e.g., a provided MAC address and an expected MAC address are different), security measures may include resource 107 remaining locked and a notification being provided to the user indicating that the user is attempting to initiate a multiple custody linkage with an invalid device. As should be appreciated, user information database 119 may include any information that may be helpful for validation circuit 118 to properly authenticate users attempting to initiate multiple custody linkages.

In some embodiments, validation circuit 118 may perform other validation processes separate from or in addition to verifying user credentials. For example, validation circuit 118 may verify information such as locations of user devices 104 and 106 with respect to resource 107, biometric information of users, whether any users are under disciplinary action and should not have access to resource 107, and can determine if any other anomalies associated with access of resource 107 exist. In effect, validation circuit 118 can perform any necessary validation/verification steps to ensure that resource 107 can be securely accessed by the users involved in the multiple custody linkage. Validation circuit 118 is described in greater detail below with reference to FIG. 2.

If validation circuit 118 determines a request for a multiple custody linkage is valid and does not pose a detectable threat to resource 107, validation circuit 118 can generate and provide an approval notification to first user device 104, second user device 106, and/or resource 107 (e.g., via network 108) indicating that the request is valid. Further, validation circuit 118 can activate the multiple custody linkage such that resource 107 can be accessed by the users. Activation of the multiple custody linkage can include actions such as unlocking resource 107, setting first user device 104 and second user device 106 in a transient state for multiple custody linkage, initiating auditing and tracking processes, etc. In some embodiments, first user device 104, second user device 106, and/or resource 107 are structured to activate the multiple custody linkage responsive to receiving the notification from validation circuit 118 indicating that the request is valid.

If validation circuit 118 determines a threat to resource 107 may exist, validation circuit 118 may deny the request. In some embodiments, denying the request includes transmitting a denial notification to first user device 104, second user device 106, and/or resource 107. In some embodiments, denying the request includes initiating various security measures respective of a desired level of security. For example, if the request is denied under a lenient level of security, resource 107 may remain locked and user devices 104 and 106 may be provided a notification indicating that resource 107 will remain locked due to a failed validation. As another example under a higher level of security, if the request is denied by institution computing system 102, a security team may be notified that resource 107 is in jeopardy and may require intervention to secure resource 107. In some embodiments, security measures to initiate responsive to a denial notification are set by a user (e.g., a manager of the institution). In some embodiments, institution computing system 102 automatically initiates certain security measures based on an estimated value and/or other measurement of importance of resource 107. In this way, if institution computing system 102 is responsible for monitoring multiple resources 107, different security measures can be automatically initiated for each resource 107 dependent on a level of importance of each resource 107.

If validation circuit 118 determines a request for a multiple custody linkage to access resource 107 is valid, resource 107 can be unlocked and thereby accessible to the first user and/or the second user. At this point, first user device 104 and second user device 106 can be set to a transient state for multiple (e.g., dual) custody. The transient state may be a temporary state indicating that users associated with first user device 104 and second user device 106 are allowed access to resource 107. When the transient state terminates for either of first user device 104 or second user device 106, the multiple custody linkage may likewise be terminated and resource 107 can return to a locked state. In other words, all user devices involved in the multiple custody linkage should be in the transient state for resource 107 to be unlocked.

During a multiple custody linkage, an audit circuit 120 and an interaction tracking circuit 122 of institution computing system 102 may perform various processes to log and track information associated with the multiple custody linkage. Specifically, interaction tracking circuit 122 can track information associated with resource 107 for anomalies whereas audit circuit 120 can append the information to an audit trail.

Interaction tracking circuit 122 can monitor interactions between users and resource 107 among other data points during multiple custody linkages. In particular, interaction tracking circuit 122 can monitor interactions and other information to determine if resource 107 is affected by a security threat. A security threat can be associated with a violation of security protocol associated with a resource (e.g., resource 107). In other words, if a security threat to the resource exists, some security protocol may have been violated. Security protocols can include any type of protocol that protects and ensures the safety of resource 107. For example, a security protocol may be or include a protocol defining a predefined period of time in which resource 107 can be accessed (e.g., 12:00 p.m. to 5:00 p.m.), a protocol defining a list of individuals that can access resource 107, a protocol defining conditions (e.g., environmental conditions) that resource 107 should be maintained under, a protocol defining locations (e.g., within a building) where resource 107 is permitted to be, a protocol defining a maximum allowable distance between user devices and resource 107, a protocol defining user credentials that must be verified for users to access resource 107, etc. If, at any point during the multiple custody linkage, a determination is made by interaction tracking circuit 122 that some security threat is posed to resource 107, interaction tracking circuit 122 may initiate one or more security measures. As described above, Security measures can include any actions to address security concerns related to resource 107. For example, security measures may include locking resource 107, notifying users they have violated a protocol related to handling resource 107, alerting a security team that resource 107 may be compromised, destroying resource 107, etc.

Interaction tracking circuit 122 may monitor aspects of a multiple custody linkage such as, for example, a distance that the user devices 104 and 106 are from resource 107, how the first user and/or the second user are handling resource 107, an amount of time elapsed since the multiple custody linkage began, etc. In other words, interaction tracking circuit 122 can monitor variables of the multiple custody linkage to ensure resource 107 is not in jeopardy. Interaction tracking circuit 122 and monitored information/variables associated therewith are described in greater detail below with reference to FIG. 3.

Still referring to FIG. 1A, audit circuit 120 can append information to an audit trail 121 of memory 116. Audit trail 121 can provide a detailed understanding of various aspects of multiple custody linkages. Audit circuit 120 may append information to audit trail 121 gathered before a multiple custody linkage is initiated, during the multiple custody linkage, and/or after the multiple custody linkage has terminated. In essence, audit circuit 120 can append any information that may be useful to individuals/systems analyzing audit trail 121.

Information appended to audit trail 121 by audit circuit 120 can be customizable and configurable dependent on what information is deemed important to include in audit trail 121. In some embodiments, audit circuit 120 is structured to append all information obtained by institution computing system 102 to audit trail 121 as to ensure a comprehensive view of each multiple custody linkage is available. For a particular multiple custody linkage, audit circuit 120 may append information to audit trail 121 such as, for example, what users requested access to resource 107, what information regarding the users was validated for verification purposes, when resource 107 was accessed, an amount of time the multiple custody linkage lasted, interactions that occurred during the multiple custody linkage, distances user devices 104 and 106 were from resource 107 over time, any detected security issues or protocol violations, etc.

In some embodiments, audit circuit 120 is structured to selectively append certain information in audit trail 121. In other words, audit circuit 120 may be discard some information such that it is not appended to audit trail 121. For example, audit circuit 120 may not store results of each validation performed on users by validation circuit 118 if no validation processes indicated abnormalities. While appending all information to audit trail 121 may be a most secure method of appending, selectively appending information may improve computational efficiency. In particular, selectively storing information may reduce a storage burden of audit trail 121 on memory 116, may improve efficiency in analyzing audit trail 121, etc.

Audit trail 121 may be important for providing a detailed record of all multiple custody linkages associated with resource 107. Audit trail 121 may be particularly useful if a security breach goes undetected during a multiple custody linkage (e.g., if interaction tracking circuit 122 does not detect the security breach). In this case, audit trail 121 can be referenced by an entity (e.g., by security personnel, by a computer structured to analyze audit trail 121, etc.) to identify information related to the security breach such as how and why the breach was not identified. As audit trail 121 can include various information related to multiple custody linkages, audit trail 121 can be referenced to identify how issues occur in multiple custody management system 100 and help determine possible solutions to said issues.

Audit trail 121 can take on a variety of forms. In some embodiments, audit trail 121 is a textual record of obtained information regarding multiple custody linkages. For example, audit trail 121 may be a text file including obtained data (e.g., interactions, user information, statuses of resource 107, etc.) along with timestamps of when the data was obtained by institution computing system 102 and/or originally gathered. In some embodiments, audit trail 121 is implemented via a blockchain system. Blockchain technology can help ensure immutability of audit trail 121 such that audit trail 121 cannot be easily altered by a malicious actor (e.g., a hacker). Instead, distributed nodes in the blockchain system can validate any additions/changes to the blockchain. In this way, no single node can arbitrarily change information stored in the blockchain, thereby providing additional security to audit trail 121. For example, in a financial system, the blockchain can be used to securely track usage of cash containers in multiple custody scenarios as the cash containers progress through various stages of use and as the cash containers pass through hands of multiple users. In this way, the blockchain (i.e., audit trail 121) can include an immutable record of how the cash containers are handled.

If audit trail 121 is implemented via the blockchain system, multiple custody management system 100 may include multiple institution computing systems 102, each with a local copy of the blockchain (i.e., a local copy of audit trail 121). In this case, audit circuit 120 of a particular institution computing system 102 can generate and provide a block representing information associated with a multiple custody linkage to other institution computing systems 102 in multiple custody management system 100. Based on the received block, the other institution computing systems 102 can validate the block and append the block to the existing blockchain.

Figure 1B:
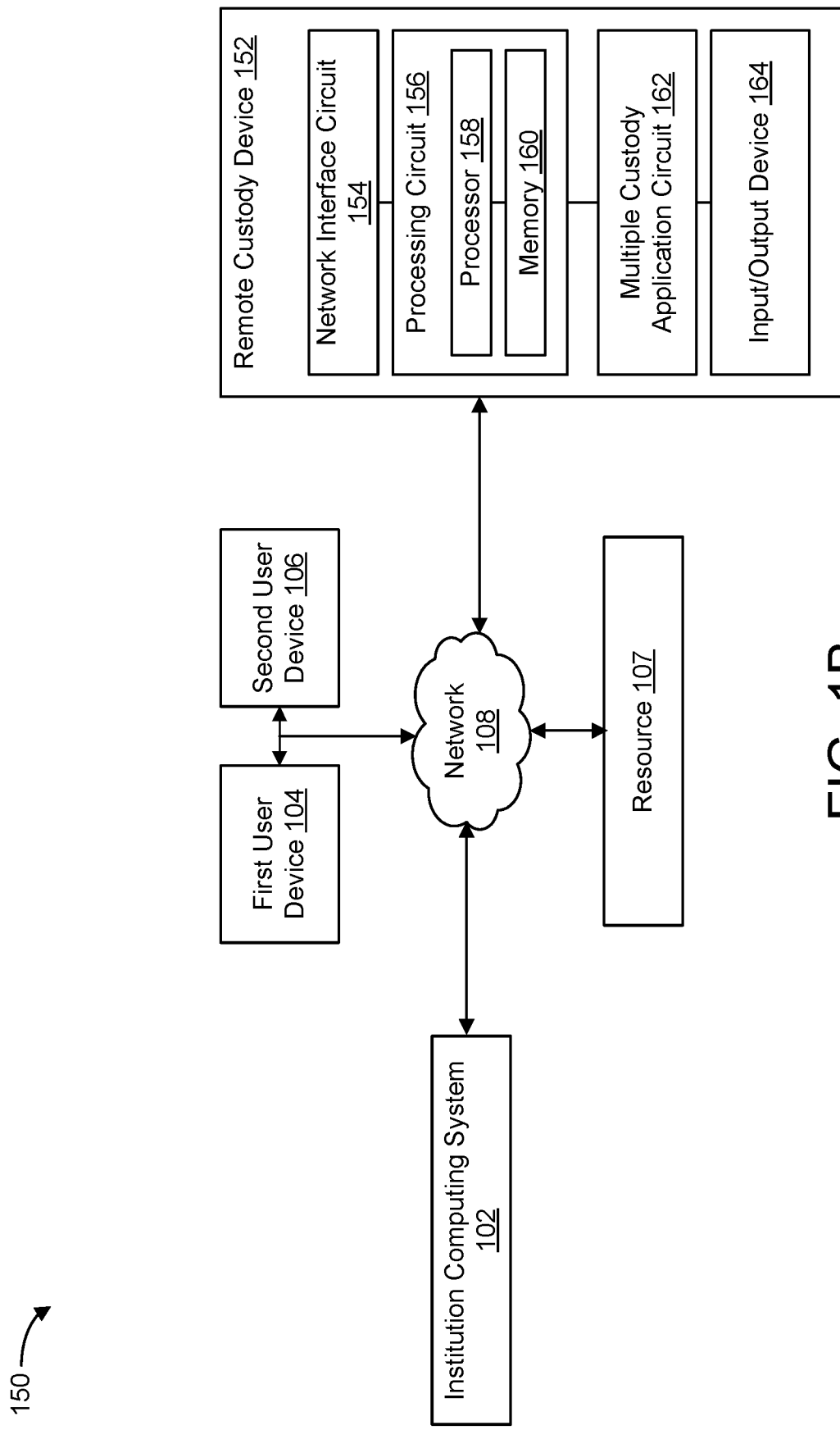
FIG. 1B is a block diagram of another multiple custody management system, according to some embodiments.

Referring now to FIG. 1B, a block diagram of a multiple custody management system 150 is shown, according to some embodiments. In some embodiments, multiple custody management system 150 is similar to and/or the same as multiple custody management system 100 as described with reference to FIG. 1A. Accordingly, multiple custody management system 150 may include some and/or all of the components of multiple custody management system 100.

Multiple custody management system 150 is shown to include a remote custody device 152. Remote custody device 152 can allow one or more users in a multiple custody linkage to be remote from resource 107 (e.g., not within the predefined distance of resource 107 as described above with reference to FIG. 1A), but nonetheless involved in a multiple custody linkage. Remote custody device 152 may be any device and/or system that allows a user to remotely participate in multiple custody linkages. For example, remote custody device 152 may be a user device (e.g., a smart phone, a laptop, a wearable, etc.) located in a building separate form a building where resource 107 is located. As another example, remote custody device 152 may be an operator computing station of a building operator for observing parts of a building. In this example, if the building is a bank, the operator computing station may allow the building operator to view parts of the building such as a vault, a teller area, a safety deposit box area, a space for storing paper files, etc. In this way, the building operator can remotely observe the building spaces and thereby participate in multiple custody linkages.

Remote custody device 152 is shown to include a network interface circuit 154. In some embodiments, network interface circuit 154 is similar to and/or the same as network interface circuit 124 as described with reference to FIG. 1A. Accordingly, network interface circuit 154 can include program logic that facilitates connection of remote custody device 152 to network 108. Network interface circuit 154 can support communication between remote custody device 152 and other systems, such as institution computing system 102 and/or first user device 104. For example, network interface circuit 154 can include a cellular modem, a Bluetooth transceiver, a Bluetooth beacon, a radio-frequency identification (RFID) transceiver, and/or a near-field communication (NFC) transmitter. In some embodiments, network interface circuit 154 includes the hardware and machine-readable media sufficient to support communication over multiple channels of data communication. In some embodiments, network interface circuit 154 includes cryptography capabilities to establish a secure or relatively secure communication session between remote custody device 152 and institution computing system 102, first user device 104, second user device 106, and/or resource 107. In this regard, information related to multiple custody linkages may be encrypted and transmitted to prevent or substantially prevent a threat of hacking.

Remote custody device 152 is also shown to include a processing circuit 156. Processing circuit 156 is shown to include a processor 158 and memory 160. Processor 158 may be implemented as one or more application specific integrated circuits (ASICs), field programmable gate arrays (FPGAs), a group of processing components, or other suitable electronic processing components. Memory 160 may be one or more devices (e.g., RAM, ROM, Flash memory, hard disk storage) for storing data and/or computer code for completing and/or facilitating the various processes described herein. Memory 160 may be or include non-transient volatile memory, non-volatile memory, and non-transitory computer storage media. Memory 160 may include database components, object code components, script components, or any other type of information structure for supporting the various activities and information structures described herein. Memory 160 may be communicably coupled to processor 158 and include computer code or instructions for executing one or more processes described herein.

Remote custody device 152 is also shown to include a multiple custody application circuit 162 and an I/O device 164. Multiple custody application circuit 162 may be similar to and/or the same as multiple custody application circuit 132 as described with reference to FIG. 1A. As such, multiple custody application circuit 162 may allow remote custody device 152 to participate in multiple custody linkages (e.g., with first user device 104 and/or second user device 106).

I/O device 164 may be similar to and/or the same as I/O device 136 as described with reference to FIG. 1A. In some embodiments, I/O device 164 includes monitoring equipment (e.g., video cameras) for ensuring that a user associated with remote custody device 152 actively monitors multiple custody linkages. The monitoring equipment can address inherent security risks associated with allowing users to participate in multiple custody linkages remotely. A primary security risk associated with remote participation is that the remote user may ignore actions of a user physically near resource 107 (e.g., by looking away from a video feed of resource 107). As such, I/O device 164 can include monitoring equipment to ensure that the user associated with remote custody device 152 is actively monitoring resource 107 during multiple custody linkages.

I/O device 164 may include, among other components, a video camera. The video camera can gather visual data that can be analyzed by interaction tracking circuit 122 during a multiple custody linkage to ensure the remote user is actively participating in the multiple custody linkage. For example, interaction tracking circuit 122 may monitor the visual data to determine if the user has left remote custody device 152, is not maintaining eye contact with the video feed of resource 107, etc. If interaction tracking circuit 122 determines the user is not actively involved in the multiple custody linkage, interaction tracking circuit 122 may initiate a security measure (e.g., terminating the multiple custody linkage and locking resource 107). It should be appreciated that video monitoring of the user is provided purely for sake of example. Ensuring active participation of remote users in multiple custody linkages can be satisfied via other forms monitoring. For example, interaction tracking circuit 122 may monitor movement of a computer mouse of I/O device 164, by monitoring audio data of a microphone component of I/O device 164, by providing prompts to a display of I/O device 164 that the remote user must click to verify attention, etc.

While remote participation in multiple custody linkages may require additional monitoring of the remote user, remote participation may nonetheless provide additional advantages. One advantage of remote participation may be in increased security for resource 107. For example, if the remote user is not directly associated with a location where resource 107 is (e.g., the remote user is located in a different building from a building storing resource 107), a probability of collusion occurring between the remote user and the user accessing resource 107 may be reduced. Specifically, the user accessing resource 107 may not directly know the remote user and therefore collusion may be inherently more difficult. Another advantage of remote participation in multiple custody linkages may be that the remote user is not required to be near resource 107. For example, if the remote user is a manager of an institution, a burden on the manager may be reduced by not requiring the manager to be physically present for each multiple custody linkage. Of course, advantages of remote participation may vary dependent on implementation.

In some embodiments, institution computing system 102 determines if remote participation in multiple custody linkages should be allowed. In particular, validation circuit 118 may perform an analysis to determine if remote participation should be allowed or if all users involved in multiple custody linkages should be physically near resource 107. The analysis performed by validation circuit 118 may be based on security considerations, convenience for users, and other considerations. If validation circuit 118 determines that remote participation appropriately maintains security of resource 107, remote custody device 152 can be utilized for multiple custody linkages. However, if remote participation is determined to pose some additional security risk to resource 107 and/or is otherwise not preferred, remote custody device 152 may be blocked from participating in multiple custody linkages.

Figure 2:
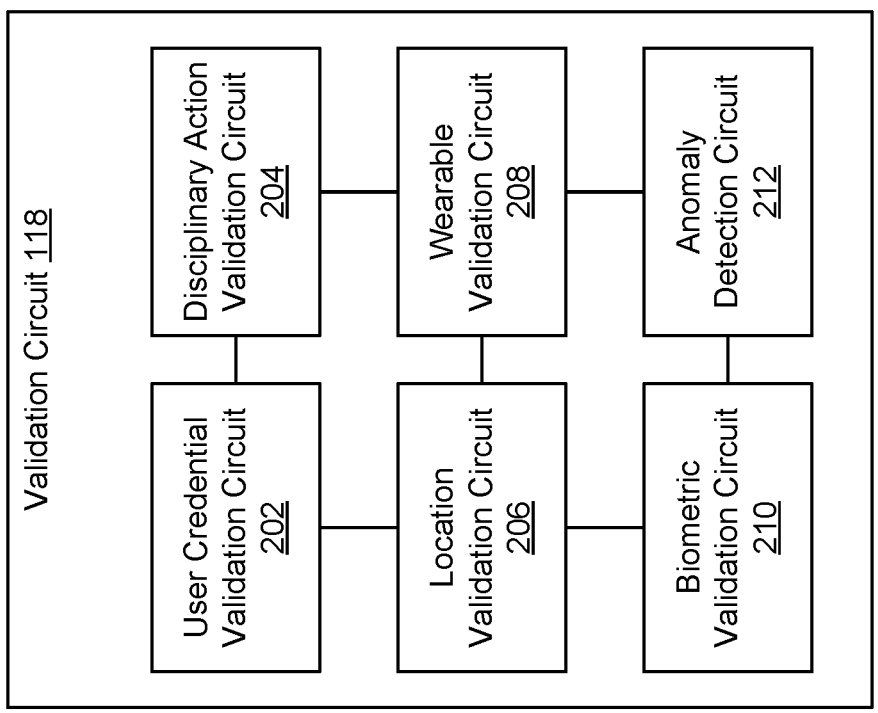
FIG. 2 is a block diagram of a validation circuit of the institution computing system of FIG. 1A, according to some embodiments.

Referring now to FIG. 2, a block diagram of validation circuit 118 is shown, according to some embodiments. It should be appreciated that components of validation circuit 118 shown in FIG. 2 and as described in detail below are given purely for sake of example. Validation circuit 118 can include any appropriate components for validating/verifying requests for multiple custody linkages. More particularly, validation circuit 118 can analyze received information to determine if any violations of security protocols associated with resource 107 have occurred and/or will occur.

By performing the validations/verifications described in detail below, a determination can be made regarding whether a request for a multiple custody linkage is valid. In some embodiments, the request is determined to be valid if at least a predetermined number of validation processes (e.g., one validation process, two validation processes, five validation processes, etc.) are successful. In some embodiments, all validation processes are required to be successful in order to validate the request. In some embodiments, other requirements are set for determining whether the request is valid. For example, a requirement may be set that a biometric scan of the user must match an expected biometric reading and at least two other validation processes must be successful. In this example, as long as three verification processes are satisfied, one of which being the biometric verification, the request is valid. Requirements for validating requests can be customized and configured depending on a level of security desired.

Validation circuit 118 is shown to include a user credential validation circuit 202. User credential validation circuit 202 can execute a user credential verification process for ensuring user credentials provided to institution computing system 102 are valid. With regard to multiple custody management system 100 as described with reference to FIG. 1A, user credential validation circuit 202 may verify credentials of the first user associated with first user device 104 and of the second user associated with second user device 106. Credentials of a user can include any information that can describe a user intending to participate in a multiple custody linkage. For example, user credentials associated with a user may include a username and password combination, an employee identification number, a device identifier (e.g., a media access control (MAC) address) of a user device associated with the user, a security authorization level of the user, a rank and/or role (e.g., manager, CEO) of the user, etc. User credential validation circuit 202 can compare the user credentials provided to institution computing system 102 to information stored in user information database 119. Based on the comparison, user credential validation circuit 202 can determine whether any provided user credentials do not match those stored in user information database 119. If one or more user credentials do not match those stored in user information database 119, the user credential verification process may fail. However, if at least a predefined number of user credentials match those in user information database 119, the user credential verification process may be successful.

In some embodiments, the credentials analyzed by validation circuit 118 are provided to institution computing system 102 responsive to first user device 104 and second user device 106 linking together and thereby switching to a pending linkage state. Credentials of the first user and the second user may be stored on first user device 104 and second user device 106 respectively (e.g., in memory 130 and memory 144). Storing the user credentials can reduce an amount of time required by users to initiate multiple custody linkages. In some embodiments, the users may manually enter one or more credentials to be validated by user credential validation circuit 202. For example, the users may enter login information (e.g., a username and password) when linking devices that can be provided to institution computing system 102 for validation. As another example, a user may manually enter an employee identification number which can be compared by user credential validation circuit 202 to verify an identity of the user.

Validation circuit 118 is also shown to include a disciplinary action validation circuit 204. Disciplinary action validation circuit 204 can perform a disciplinary action verification process to determine whether any users involved in a multiple custody linkage have an outstanding disciplinary action against them. Disciplinary actions can include any actions taken against a user to punish the user. For example, a disciplinary action taken against an employee may include mandatory unpaid leave, revoked access to areas of a building, restricted functionality on accounts associated with the user, etc. Disciplinary actions may be instituted against a user for violating some rule, protocol, law, etc. For example, if an employee of a bank attempts to illegally access customer safety deposit boxes, a disciplinary action barring the employee from access to the safety deposit boxes may be instated. In some embodiments, disciplinary actions are stored in user information database 119 such that the disciplinary actions can be easily identified based on determined identities of users.

Disciplinary action validation circuit 204 can determine if any disciplinary actions are imposed against a particular user. If any disciplinary actions are outstanding for the user, disciplinary action validation circuit 204 may make further determinations of whether the user should be permitted access to resource 107. Even if any disciplinary actions pending for the user are not related to resource 107, the disciplinary actions may nonetheless indicate that the user poses a possible security threat to resource 107 and/or otherwise violates some security protocol. Accordingly, disciplinary action validation circuit 204 may identify information such as what disciplinary actions are outstanding for the user or what actions were taken by the user to result in the disciplinary actions, in order to determine if the user poses a security threat to resource 107. Based on the determination, disciplinary action validation circuit 204 can indicate whether the disciplinary action verification is successful or unsuccessful. For example, if a user has a disciplinary action outstanding because the user missed a day of work, disciplinary action validation circuit 204 may determine that the user does not pose a threat to resource 107 and therefore the disciplinary action verification process is successful. However, if the user has a disciplinary action for attempting to steal from the institution, disciplinary action validation circuit 204 may determine the user does pose a threat to resource 107 and the disciplinary action verification process may fail.

In some embodiments, disciplinary action validation circuit 204 determines if a user is actively "on the clock" (i.e., is scheduled to be working at a current time). A user attempting to access resource 107 at a time when the user is not scheduled to be working may indicate an abnormality in a request for a multiple custody linkage. In other words, disciplinary action validation circuit 204 may be configured to expect a user to attempt to access resource 107 when the user is scheduled to work. To determine if a user is scheduled to work at a given time, disciplinary action validation circuit 204 may reference a scheduling system to identify when the user requesting a multiple custody validation is scheduled to be working. Disciplinary action validation circuit 204 may send a request to the scheduling system to retrieve a schedule for the user and can analyze the schedule for the user to determine if the user is scheduled to work at the given time. In some embodiments, scheduling information is included in user information database 119. If disciplinary action validation circuit 204 determines the user is scheduled to be working at the given time, disciplinary action validation circuit 204 may determine that no threat is posed to resource 107 in terms of when the user is working. However, if disciplinary action validation circuit 204 determines that the user is attempting to access resource 107 at a time outside of scheduled hours, disciplinary action validation circuit 204 may initiate a security measure to ensure resource 107 is secure. In some embodiments, some users may be exempt from schedule comparisons (e.g., users with a role above a role threshold). In this case, the exempt users may be unrestricted for when they access resource 107. Alternatively, the exempt users may be prevented from accessing resource 107 based on some other time-based restriction (e.g., exempt users can only access resource 107 between 9:00 a.m. to 5:00 p.m.).

Validation circuit 118 is also shown to include a location validation circuit 206. Location validation circuit 206 can identify a distance that each user device involved in a pending multiple custody linkage is from resource 107. With regard to multiple custody management system 100, location validation circuit 206 may determine how far first user device 104 and second user device 106 are from resource 107. In some embodiments, location validation circuit 206 also determines how far first user device 104 and second user device 106 are from one another. To determine distances between first user device 104, second user device 106, and/or resource 107, location validation circuit 206 may utilize information such as a global positioning signal (GPS) location, a fourth generation broadband cellular network technology (4G), WiFi signals, etc. Said location information can be automatically transmitted by first user device 104, second user device 106, and/or resource 107 to institution computing system 102 for validation purposes.

If any distance determined by location validation circuit 206 exceeds a predefined distance threshold, location validation circuit 206 may deny a request for a multiple custody linkage. Specifically, location validation circuit 206 may deny the request if any determined distance exceeds a distance threshold. If a distance exceeds the distance threshold, one or more users may not be closely monitoring resource 107, thereby posing a possible security threat to resource 107 and violating a security protocol associated with monitoring of resource 107. It should be noted that if remote participation in multiple custody linkages is allowed, location validation circuit 206 may only validate a distance between a user device of a user accessing resource 107 and resource 107 itself to ensure the user is not leaving resource 107 unattended. In other words, a user remotely participating in the multiple custody linkage may not be required to be within a predefined distance of resource 107 and/or the user accessing resource 107.

In some embodiments, location validation circuit 206 performs an additional verification process to determine recent locations of user devices involved in a multiple custody linkage. Identifying recent locations of the user devices can act as an additional defense against hacking attempts such as location spoofing. For example, if a user device was recently reported (e.g., within the past ten minutes) to be at a location A and is now reporting to be at a location B that is a two hour drive away, location validation circuit 206 may identify a possible security threat and/or security protocol violation. Specifically, location validation circuit 206 may determine the location of the user device is being spoofed and can initiate appropriate security measures to address the spoofing.

Validation circuit 118 is also shown to include a wearable validation circuit 208. Wearable validation circuit 208 can make a determination regarding whether a user has removed a wearable device associated with a request for a multiple custody linkage. For the multiple custody linkage to be valid, the user may be required to wear the wearable device prior to the multiple custody linkage beginning. Accordingly, wearable validation circuit 208 can determine if the user is wearing the wearable device before the multiple custody linkage begins. If wearable validation circuit 208 determines the user is wearing the wearable device, wearable validation circuit 208 can confirm the request. However, if wearable validation circuit 208 determines the user is not wearing the wearable device, wearable validation circuit 208 may deny the request.

To determine if the user is wearing the wearable device, wearable validation circuit 208 can analyze information provided by the wearable device. For example, if the wearable device is a smart watch, the smart watch may provide a heartbeat measurement that wearable validation circuit 208 can analyze to determine if the user is actively wearing the wearable device. If the heartbeat measurement is above zero and/or is within a reasonable range of values for a heartbeat (e.g., 50-180 beats per minute (BPM)), wearable validation circuit 208 may verify the request. If the heartbeat measurement is zero and/or is not in the reasonable range of values (e.g., the heartbeat measurement is 250 BPM), wearable validation circuit 208 may determine that the user removed the wearable device and/or some other issue exists.

In some embodiments, wearable validation circuit 208 analyzes biological feedback obtained by wearable devices to identify possible security threats to resource 107. Examples of biological feedback information that wearable devices can provide may include, but are not limited to, heartbeat rate, a level of perspiration, shaking/fidgeting, body heat, etc. For example, wearable validation circuit 208 may detect high heart rates as a possible indication of a security threat. As a specific example, if resource 107 includes data that is accessible by sitting at a computer, but a user involved in a multiple custody linkage has a heart rate of 150 BPM and is sweating profusely, wearable validation circuit 208 may determine that the user is peculiarly nervous and deny the request. Advantageously, wearable validation circuit 208 can utilize biological feedback of users associated with a request for a multiple custody linkage to determine if any users are providing irregular biological feedback that may be indicative of a possible security threat. In this case, an associated security protocol may describe that all users associated with a multiple custody linkage must exhibit certain physical qualities that are not indicative of intense stress or anxiety.

Still referring to FIG. 2, validation circuit 118 is shown to include a biometric validation circuit 210. Biometric validation circuit 210 can be structured to verify biometric scans provided by users to ensure the biometric scans match expected biometric scans (e.g., as stored in user information database 119). In particular, biometric validation circuit 210 may compare biometric scans such as, for example, fingerprints, iris scans, audio including a user's voice, DNA, etc. to expected values. In some embodiments, biometric validation circuit 210 is included in user credential validation circuit 202 such that biometric scans are considered a user credential. However, biometric validation circuit 210 is shown separately for sake of clarity.

Validation circuit 118 is also shown to include an anomaly detection circuit 212. Anomaly detection circuit 212 can perform additional processes to determine if any additional anomalies and/or other possible security threats to resource 107 exist prior to initiating a multiple custody linkage. Anomalies as described herein can include any unexpected values (e.g., of measurements, results, information, etc.) that do not align with expected values. In this case, expected values may refer to a range of values defined by a user, an exact value of a variable (e.g., a password provided by a user should exactly match a stored password to be valid), etc. In some embodiments, the term "anomaly" is used interchangeably herein with the term "abnormality." As an example of an anomaly, anomaly detection circuit 212 may monitor an indoor air temperature near resource 107 to identify abnormal changes in temperatures. Changes in air temperature may indicate, for example, that a space including resource 107 has been breached. As another example, anomaly detection circuit 212 may determine an amount of time that has elapsed since a last time resource 107 was accessed to determine if the amount of time is significantly shorter or longer than an average amount of time between access requests for resource 107. Values monitored by anomaly detection circuit 212 can be customizable and configurable dependent on a level of security desired.

It should be noted that the validation processes performed by circuits 202-210 can be considered anomaly validation processes. In other words, the information validated by circuits 202-210 may be considered anomalous if the information provided to circuits 202-210 does not match expected values. Accordingly, in some embodiments, anomaly detection circuit 212 may include some and/or all of the functionality of circuits 202-210.

In some embodiments, anomaly detection circuit 212 monitors values indicating possible signs of collusion as a form of anomaly. Collusion between users involved in multiple custody linkages may pose a threat that is difficult to detect if the users are otherwise permitted to access resource 107. Specifically, if users involved in the multiple custody linkage provide the correct credentials, do not have disciplinary actions outstanding, are in the correct location, etc., validation circuit 118 may otherwise allow the users to access resource 107. Accordingly, anomaly detection circuit 212 can monitor variables for possible signs of collusion. For example, if resource 107 is an automated teller machine (ATM) recently loaded with cash, anomaly detection circuit 212 may identify possible collusion if users are attempting to access the ATM shortly after the cash is loaded.

To combat collusion between users and other anomalies, anomaly detection circuit 212 may incorporate artificial intelligence (AI) to analyze variables to determine if anomalies are present with respect to accessing resource 107. Anomaly detection circuit 212 can incorporate AI models to study patterns over time. Over time the AI models can be trained to recognize certain variables/patterns that are associated with anomalies and other threats to resource 107. In this way, the AI models can be trained to flag anomalies as if an auditor or detective were manually analyzing various aspects related to access of resource 107. As an example of information the AI models may flag as an anomaly, the AI models may learn to identify unusual changes to work shift assignments that have previously resulted in unauthorized cash withdrawals. Based on the learned associated between unusual work shift assignment changes and unauthorized cash withdrawals, anomaly detection circuit 212 may deny future requests for multiple custody linkages after unusual work shift assignment changes occur.

In some embodiments, components or than or in addition to anomaly detection circuit 212 incorporate AI models to assist in verification of requests for multiple custody linkages. In some embodiments, validation circuit 118 includes a single AI model that accepts a set of inputs (e.g., inputs to any and/or all of circuits 202-212 as described above) associated with a request for a multiple custody linkage and outputs a decision as to whether the request should be approved or denied.

Figure 3:
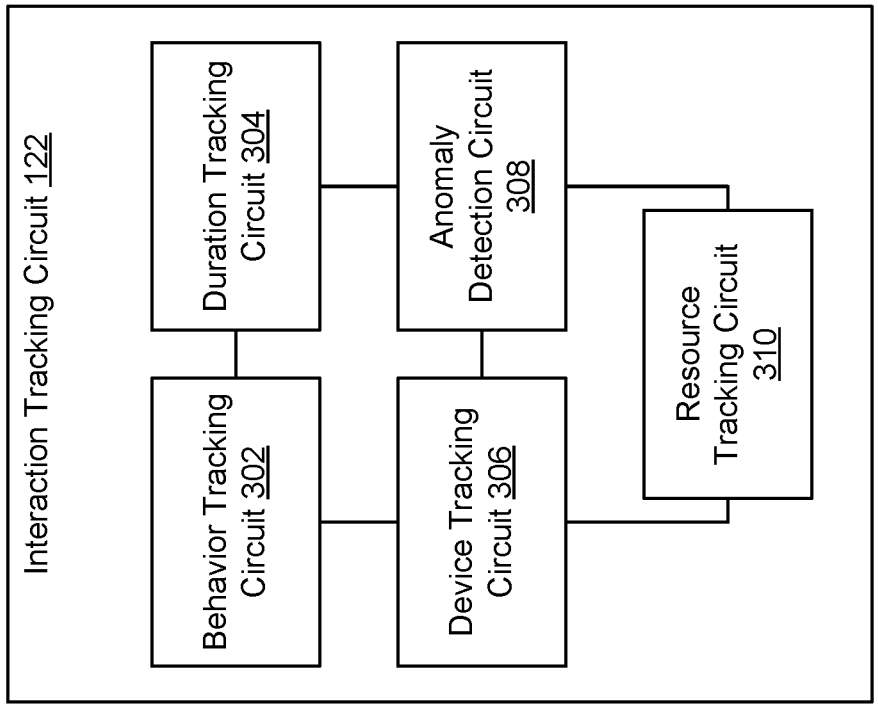
FIG. 3 is a block diagram of an interaction tracking circuit of the institution computing system of FIG. 1A, according to some embodiments.

Referring now to FIG. 3, a block diagram of interaction tracking circuit 122 is shown, according to some embodiments. Interaction tracking circuit 122 can monitor/track various aspects of active multiple custody linkages to ensure that no threat is posed to resource 107. Specifically, interaction tracking circuit 122 can monitor information during a multiple custody linkage for any violations of security protocols associated with resource 107. Similar to validation circuit 118 as described with reference to FIG. 2, it should be appreciated that components of interaction tracking circuit 122 as shown in FIG. 3 and as described in detail below are given purely for sake of example. Interaction tracking circuit 122 can include any appropriate components for tracking information related to multiple custody linkages. In some embodiments, interaction tracking circuit 122 and validation circuit 118 are incorporated in a single component of institution computing system 102. However, interaction tracking circuit 122 and validation circuit 118 are shown and described separately for ease of explanation. In particular, validation circuit 118 is utilized for validating requests for multiple custody linkages whereas interaction tracking circuit 122 tracks information during multiple custody linkages to ensure the multiple custody linkages do not pose a threat to resource 107.

In some embodiments, some and/or all of the components of interaction tracking circuit 122 have a corresponding component in validation circuit 118 and vice versa. In this way, components of validation circuit 118 may determine whether certain variables/information indicate resource 107 is secure prior to initiating a multiple custody linkage, whereas the corresponding components of interaction tracking circuit 122 can monitor variables/information to determine if a threat to resource 107 exists during a multiple custody linkage. Of course, validation circuit 118 and interaction tracking circuit 122 may monitor different variables and information depending on implementation.

Interaction tracking circuit 122 is shown to include a behavior tracking circuit 302. Behavior tracking circuit 302 can monitor behavior of users involved in active multiple custody linkages to determine if behavior of the users is abnormal. Defining normality of behavior may be dependent on specific use cases. In other words, what is defined as "normal" behavior may be dependent on variables such as what resource 107 is, why resource 107 needs to be accessed by the users, etc. Behaviors that can be monitored by behavior tracking circuit 302 may include, but are not limited to, a speed of movement (e.g., as indicated by a motion tracking module of user devices), biological feedback measurements (e.g., heart rate, level of perspiration), speech patterns, where a user moves resource 107, etc. Behavioral measurements can be measured by user devices, sensors near and/or on resource 107, video cameras, or any other appropriate device.

In some embodiments, a single behavioral abnormality may not inherently indicate a threat to resource 107. For example, a high heart rate of a user involved in a multiple custody linkage may be expected if resource 107 is a heavy object that needs to be moved by the user. However, multiple behavioral abnormalities may be indicative of a possible threat to resource 107. To determine if a threat is posed to resource 107, behavior tracking circuit 302 may include an AI model to monitor various behavioral attributes in tandem to determine if a threat exists. The AI model can be trained to associate certain behaviors that have previously led to security threats to resources. Based on the training, if the AI model determines a set of behavioral attributes indicate a threat to resource 107, behavior tracking circuit 302 can terminate the multiple custody linkage and/or initiate some other security measure.

Interaction tracking circuit 122 is also shown to include a duration tracking circuit 304. Duration tracking circuit 304 can track an amount of time that elapses after a multiple custody linkage begins. In some embodiments, duration tracking circuit 304 can estimate an amount of time accessing resource 107 should take. The estimated amount of time may be manually entered by a user, based on previous accesses to resource 107, etc. If the actual amount of time users take to access resource 107 is significantly shorter or significantly larger than the estimated amount of time, duration tracking circuit 304 may terminate the multiple custody linkage and/or initiate some security measure. An amount of time that appears abnormal to duration tracking circuit 304 can be customizable and configurable depending on a level of security desired. For example, abnormal amounts of time may be defined as +10% of the estimated amount of time, greater than or less than five minutes of the estimated amount of time, etc.

Still referring to FIG. 3, interaction tracking circuit 122 is shown to include a device tracking circuit 306. Device tracking circuit 306 can monitor user devices (e.g., first user device 104 and second user device 106) involved in a multiple custody linkage for abnormalities. For example, device tracking circuit 306 may monitor a distance between the user devices and resource 107 to ensure users are physically near resource 107 for a duration of the multiple custody linkage. In multiple custody linkages with remote participation, device tracking circuit 306 may monitor, for example, a distance between resource 107 and a user device of a user accessing resource 107 as well as monitor feedback (e.g., video feedback) provided by a remote device/system to ensure a remote user is actively involved in the multiple custody linkage. If device tracking circuit 306 determines some user may be uninvolved in the multiple custody linkage and/or detects some other abnormality associated with the user devices, device tracking circuit 306 may terminate the multiple custody linkage and/or initiate a security measure.

Interaction tracking circuit 122 is also shown to include an anomaly detection circuit 308. In some embodiments, anomaly detection circuit 308 is similar to anomaly detection circuit 212 as described with reference to FIG. 2. In particular, anomaly detection circuit 308 can monitor a multiple custody linkage for signs of collusion and/or other anomalies. In some embodiments, anomaly detection circuit 308 includes an AI model for monitoring various inputs for abnormalities. If anomaly detection circuit 308 determines a threat exists to resource 107 as a result of detected anomalies, anomaly detection circuit 308 can terminate the multiple custody linkage and/or initiate a security measure.

Similar to anomaly detection circuit 212, anomaly detection circuit 308 may include some and/or all of the functionality of other circuits of interaction tracking circuit 122. For example, anomaly detection circuit 308 may be structured to detect behavioral anomalies, duration anomalies, device anomalies, resource anomalies, etc. As should be appreciated, any interactions or other information monitored by interaction tracking circuit 122 can be monitored for anomalies (i.e., for values that do not match expected values).

Interaction tracking circuit 122 is shown to include a resource tracking circuit 310. Resource tracking circuit 310 can monitor a state of resource 107 to determine if resource 107 has been or may be compromised during a multiple custody linkage. Specifically, resource tracking circuit 310 can monitor information such as, for example, a location of resource 107 (e.g., based on positioning signals provided by resource 107 such as GPS, Bluetooth signals, WiFi signals, etc.), how resource 107 changes during the multiple custody linkage, and/or any other appropriate information regarding a state of resource 107. In effect, resource tracking circuit 310 can monitor any variables and information applicable to determining a state of resource 107. If resource tracking circuit 310 determines the state of resource 107 is abnormal, resource tracking circuit 310 can terminate the multiple custody linkage and/or initiate a security measure.

In some embodiments, some and/or all of the components of interaction tracking circuit 122 incorporate AI models to determine if a threat exists in relation to resource 107. In some embodiments, interaction tracking circuit 122 includes a single AI model for monitoring various aspects associated with multiple custody linkages. In this case, the single AI model can utilize inputs to the various components of interaction tracking circuit 122 described above and determine if a threat to resource 107 may exist.

Figure 4A:
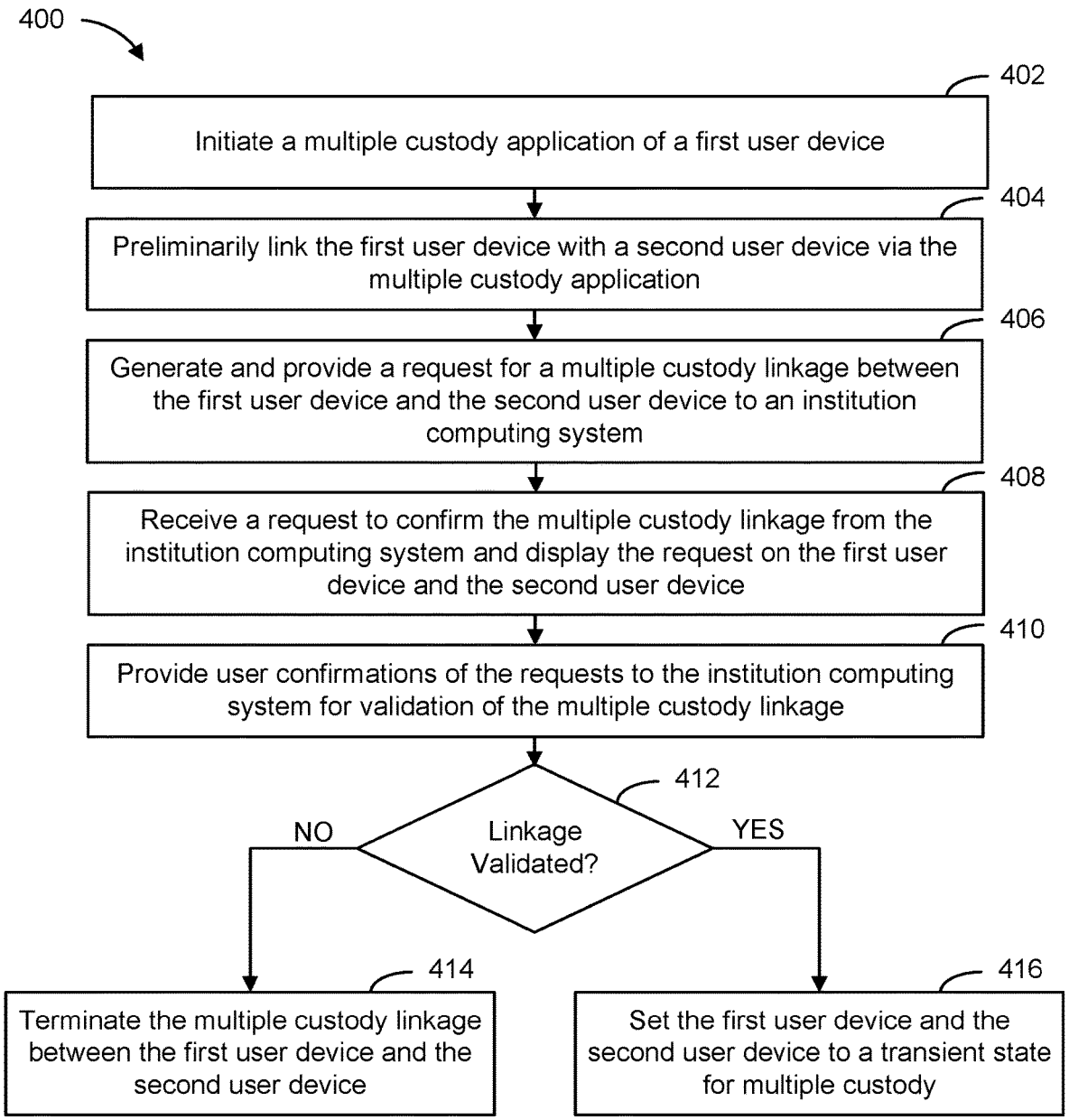
FIG. 4A is a flow diagram of a process for initiating a multiple custody linkage between two user devices, according to some embodiments.

Referring now to FIG. 4A, a flow diagram of a process 400 for initiating a multiple custody linkage between two user devices is shown, according to some embodiments. It should be noted that process 400 is described with particular reference to a dual custody linkage. However, process 400 can be applied to any type of multiple custody linkage (e.g., dual custody linkage, triple custody linkage, quadruple custody linkage, etc.) depending on a number of users and user devices involved in the linkage. In some embodiments, some and/or all steps of process 400 are performed by user device 104 and/or user device 106.

A multiple custody application of a first user device is initiated at step 402. The multiple custody application initiated at step 402 can allow a user of the first user device to perform various operations associated with multiple custody linkages. For example, the multiple custody application may allow the user to link the first user device with a second user device, receive requests for linking, generate requests for initiating multiple custody linkages, etc. In some embodiments, step 402 is performed by first user device 104.

The first user device and the second user device are preliminarily linked via the multiple custody application at step 404. A preliminary linkage between the first and second user devices can indicate a state where the first and second user devices are prepared to enter a multiple custody linkage together, but the multiple custody linkage is not yet active. In some embodiments, step 404 is completed by the user of the first user device sending a request, via the multiple custody application, to the second user device. In some embodiments, the first and second user devices are preliminarily linked responsive to a shortcut to kick off the linkage process such as the first and second user devices being bumped together, the users of the first and second user devices performing coordinated gestures, etc. In this case, the multiple custody application (e.g., multiple custody application circuit 132, 146, 162) may detect the shortcut and automatically link the first and second user devices. In some embodiments, step 404 is performed by first user device 104.

A request for a multiple custody linkage between the first user device and the second user device is generated and provided to an institution computing system at step 406. In some embodiments, the request is automatically generated responsive to the first user device and the second user device being preliminarily linked. In some embodiments, the request is manually generated by a user of either the first user device or the second user device (e.g., by pressing a button of the multiple custody application). In this case, the users may wait to generate the request until they are near a resource and/or are otherwise prepared for the multiple custody linkage. The request may be provided to any institution computing system responsible for validating the request (e.g., institution computing system 102). In some embodiments, step 406 is performed by first user device 104 and/or second user device 106.

A request to confirm the multiple custody linkage is received from the institution computing system and displayed on the first user device and the second user device at step 408. The request can be transmitted to the first and second user devices via the institution computing system 102 and displayed to the user via the first and second user devices. The requests for confirmation can ensure that the users are prepared for the multiple custody linkage. The users may receive the request, for example, by a notification displayed via the multiple custody applications of the first and second user devices. Accordingly, step 408 may further include generating one or more graphical displays including the request that can be displayed on the first and second user devices such that the user can confirm (or deny) the request. In some embodiments, the request to confirm the multiple custody linkage is only displayed on one of the first user device or the second user device. In some embodiments, step 408 is performed by first user device 104 and/or second user device 106.

User confirmations of the requests are provided to the institution computing system 102 for validation of the multiple custody linkage at step 410. In some embodiments, process 400 only proceeds to step 412 after all users involved in the multiple custody linkage provide confirmations that they are prepared for the multiple custody linkage. In some embodiments, the request generated and provided at step 406 functions additionally as confirmation that the users of the first and second user devices are prepared for the multiple custody linkage. In this case, steps 408 and 410 may or may not be included in process 400. In some embodiments, step 410 is performed by first user device 104 and/or second user device 106.

An approval message or a denial message indicating whether the multiple custody linkage is validated is received from the institution computing system at step 412. Validation of the multiple custody linkage can be performed by the institution computing system. The institution computing system may analyze different variables and information to determine if a resource associated with the multiple custody linkage is secure and will be secure if the multiple custody linkage is approved. Variables and information such as user credentials (e.g., usernames and passwords, biometrics, disciplinary records of the users, etc.), locations of the first and second user devices with respect to the resource, and/or other information associated with anomalies can be analyzed by the institution computing system to determine if a threat to the resource may exist. Once analyzed, the institution computing system can transmit the approval message or the denial message to the first user device and/or the second user device. If an approval message is received by the first user device and/or the second user device at step 412 (step 412, "YES"), process 400 can proceed to step 416. In essence, the approval message can indicate that the institution computing system did not identify any threat to the resource. If a denial message is received by the first user device and/or the second user device at step 412 (step 412, "NO"), process 400 can proceed to step 414. In some embodiments, step 412 is performed by first user device 104 and/or second user device 106.

The multiple custody linkage between the first user device and the second user device is terminated at step 414. If step 414 is performed, some threat to the resource may exist. In other words, if step 414 is performed, a denial message may have been received in step 412 as a result of the institution computing system identifying some threat to the resource. Accordingly, the multiple custody linkage can be terminated in order to maintain security of the resource. Termination of the multiple custody linkage may include various actions such as, for example, notifying the users that the request was denied via the multiple custody applications of the first and second user devices, ending the preliminary link between the user devices, disabling the multiple custody application, etc. In some embodiments, step 414 is performed by first user device 104 and/or second user device 106.

The first user device and the second user device are set to a transient state for multiple custody at step 416. If step 416 is performed, no threat to the resource may have been identified at step 412 (i.e., an approval message was received). Accordingly, the first and second user devices can be set to the transient state for a duration of the multiple custody linkage to indicate the user devices are authorized to access the resource. In some embodiments, step 416 is performed by first user device 104 and/or second user device 106.

Figure 4B:
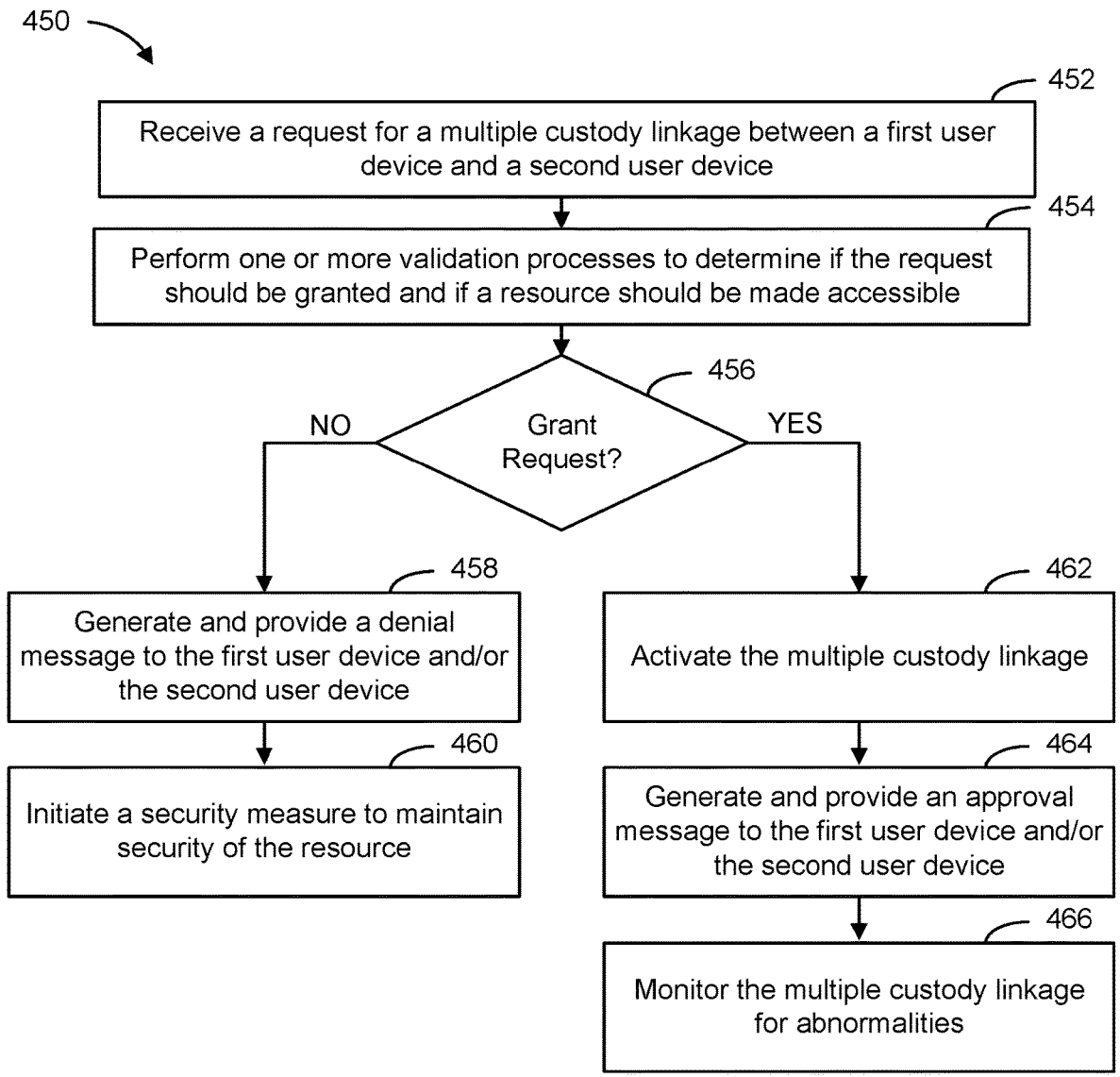
FIG. 4B is a flow diagram of a process for validating a multiple custody linkage between two user devices, according to some embodiments.

Referring now to FIG. 4B, a flow diagram of a process 450 for validating a multiple custody linkage between two user devices is shown, according to some embodiments. Validation of the multiple custody linkage can help increase security of a resource (e.g., data, cash, valuable items, a person, etc.) by ensuring that no immediate threat is posed to the resource. In some embodiments, process 450 is performed by institution computing system 102.

A request for a multiple custody linkage between a first user device and a second user device is received at step 452. The request can include various information associated with the first and second user devices and the multiple custody linkage in general. For example, the request may indicate a specific resource for which access is requested, device identifiers associated with the first and second user devices, identifying information of users (e.g., biometrics, social security numbers, employee personal identification numbers (PINs), etc.), a location of the first and second user devices with respect to the resource, a designation of why access to the resource is needed, and/or any other information that may be applicable to determining whether to grant the request. In some embodiments, step 452 is performed by institution computing system 102.

One or more validation processes to determine if the request should be granted and if the resource should be made accessible are performed at step 454. The validation processes can ensure that the request is not associated with a security protocol violation that may jeopardize a resource. Validation processes may include, for example, verifying biometrics of users, verifying user credentials (e.g., a username and password) provided by the users, determining whether any disciplinary actions are outstanding for any of the users, verifying that the users and/or user devices are within a predefined range of the resource, etc.

A number of validation processes performed in step 454 may be associated with a desired level of security for the resource. For example, a higher level of security may be desired for a resource with a high value (e.g., a high monetary value). The higher desired level of security may thereby result in a larger number of validation processes being performed as compared to a resource with a low value. In other words, a desired level of security may correlate with a number of security protocols analyzed for possible violations. In some embodiments, a single validation process that accounts for multiple security considerations is performed at step 454. For example, if an artificial intelligence (AI) agent is utilized to determine whether the request should be granted, the AI agent can be provided multiple inputs associated with security of the resource (e.g., user credentials, user biometrics, distances between the user devices and the resource, etc.) and can output a determination of whether the request should be granted. In any case, if the one or more validation processes indicate that no threat to the resource exists (e.g., no security protocols are violated), the request may be valid and the resource can be made accessible by the users associated with the first and second user devices. However, if the one or more validation processes indicate that a threat to the resource does exist (e.g., one or more security protocols are violated), the resource should be inaccessible to the users. In some embodiments, step 454 is performed by validation circuit 118.

A determination of whether the request should be granted is made at step 456. The determination of step 456 can be based on the one or more validation processes performed in step 454. Specifically, the determination of whether to grant the request may be based on whether the one or more validation processes indicate that a security protocol violation has occurred. If the determination in step 456 is that the request should be granted (step 456, "YES"), process 450 can proceed to step 462. If the determination in step 456 is that the request should not be granted (step 456, "NO"), process 450 can proceed to step 458. In some embodiments, step 456 is performed by validation circuit 118.

A denial message is generated and provided to the first user device and/or the second user device at step 458. The denial message can be displayed by the first user device and/or the second user device to indicate to the respective user that the multiple custody linkage will not be initiated and that the request is denied. In some embodiments, step 458 may be omitted from process 450 if the users should not be made aware that the multiple custody linkage is denied. For example, if the users are determined to pose a large security threat to the resource (e.g., the users violate multiple security protocols), the users may not be notified such that security measures can be initiated without direct knowledge of the users. In some embodiments, step 458 is performed by validation circuit 118.

A security measure to maintain security of the resource is initiated at step 460. The security measure can include a variety of measures to ensure an overall risk to the resource is minimized/reduced. For example, the security measure may be the generation and transmittal of the denial message to the first user device and/or the second user device as performed in step 458. Other examples of security measures may include, alerting a security force (e.g., a private security detail, police, etc.), further locking the resource, destroying the resource, etc. The security measure initiated in step 460 can be configured and customized as desired. In some embodiments, step 460 is performed by validation circuit 118.

The multiple custody linkage is activated at step 462. If step 462 is performed, the request may have been granted in step 456. In other words, if step 462 is performed, no threat to the resource may be detected as a result of the one or more validation processes performed in step 454. Activating the multiple custody linkage can include officially establishing a connection between the first user device and the second user device that allows multiple custody procedures to be performed. Specifically, activating the multiple custody linkage may include setting the first and second devices into a transient state for multiple custody. Step 462 may also include performing a variety of actions to ensure the resource can be properly accessed. For example, if the resource to be accessed is encrypted data stored on a computer, step 462 may include unlocking the computer and decrypting the data. As another example, if the resource is gold stored in a vault of a bank, step 462 may include unlocking the vault if the first and second user devices are within a predefined range of the vault. As yet another example, if the resource is an individual in a secure room, step 462 may include unlocking the room if the first and second user devices are within a predefined range of the vault as well as notifying the individual that the users associated with the first and second user devices are about to enter the secure room. Similar to the security measure described in step 460, actions/processes included in activation of the multiple custody linkage can be configured and customized as desired. In some embodiments, step 462 is performed by validation circuit 118.

An approval message is generated and provided to the first user device and/or the second user device at step 464. The approval message can be displayed by the first user device and/or the second user device to notify the associated users that the request for the multiple custody linkage was granted and that the resource can be accessed. In some embodiments, step 464 is performed by validation circuit 118.

The multiple custody linkage is monitored for abnormalities at step 466. Monitoring the multiple custody linkage can ensure that security of the resource is maintained throughout a duration of the multiple custody linkage. Specifically, step 466 can include monitoring information associated with the multiple custody linkage to identify security protocol violations during the multiple custody linkage. If a security protocol violation is identified, some security measure can be initiated to protect the resource from further harm. In some embodiments, multiple security protocol violations are required to occur for security measures to be initiated. In some embodiments, step 466 includes performing process 500 as described in detail below with reference to FIG. 5. In some embodiments, step 466 is performed by interaction tracking circuit 122 and/or other components of institution computing system 102.

Figure 5:
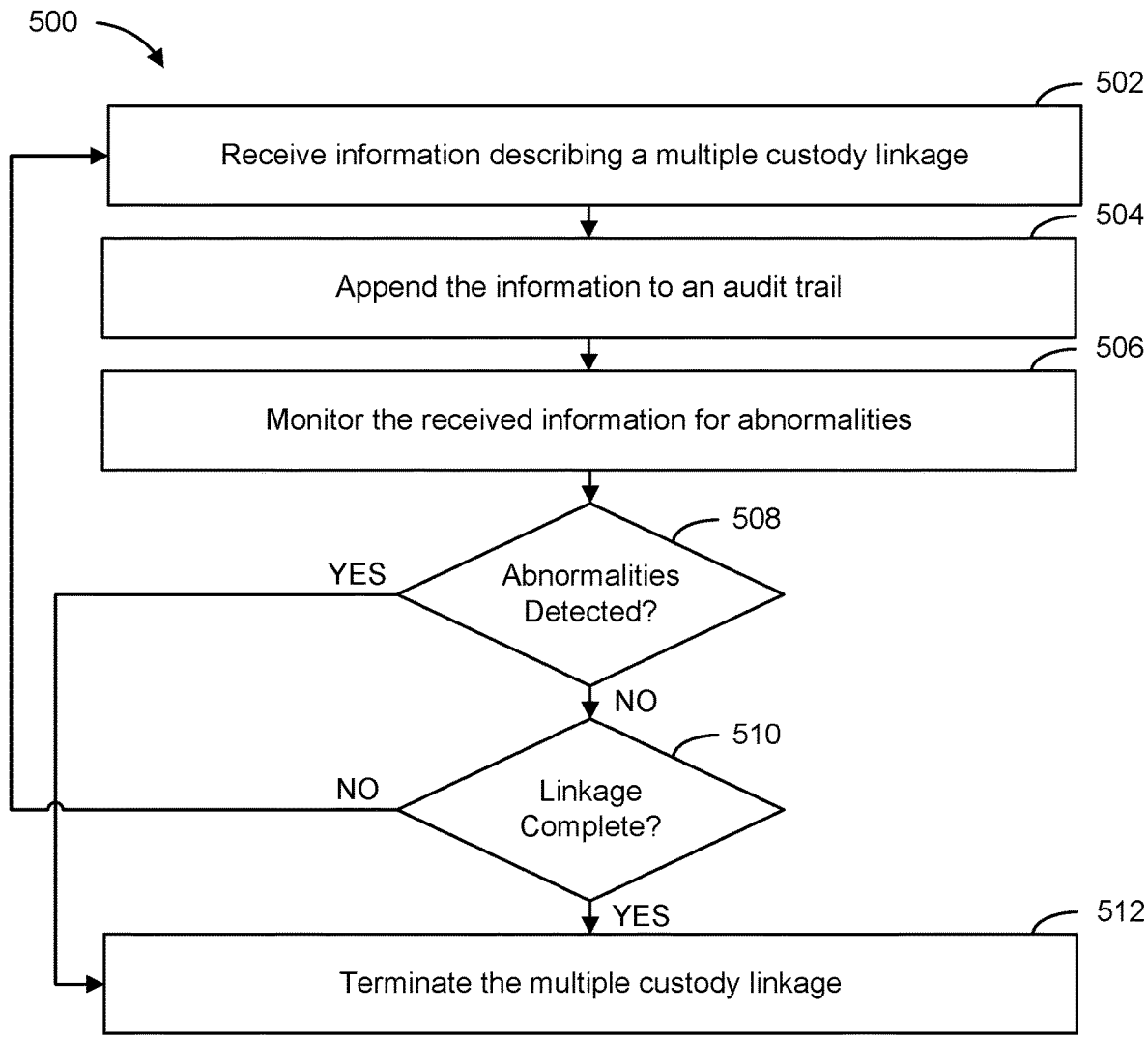
FIG. 5 is a flow diagram of a process for monitoring a multiple custody linkage, according to some embodiments.

Referring now to FIG. 5, a flow diagram of a process 500 for monitoring a multiple custody linkage is shown, according to some embodiments. In some embodiments, process 500 is performed responsive validation of a request for a multiple custody linkage. Specifically, process 500 may be performed as a component of step 466 as described with reference to FIG. 4B. In some embodiments, some and/or all steps of process 500 are performed by institution computing system 102 and/or components thereof.

Information describing a multiple custody linkage is received at step 502. The information describing the multiple custody linkage may include any information that can be analyzed to determine if a security threat may be affecting a resource during the multiple custody linkage. For example, the information may include behavioral information of users involved in the multiple custody linkage, a duration of the multiple custody linkage, sensor readings gathered by sensors near the resource, video feeds, feedback provided by user devices associated with the multiple custody linkage, etc. In some embodiments, step 502 is performed by institution computing system 102.

The information is appended to an audit trail at step 504. In some embodiments, the audit trail is a detailed record of any and/or all information associated with multiple custody linkages. The information gathered at step 502 may be appended to the audit trail along with a timestamp of when the information was originally gathered and/or a timestamp of when the information is received at step 502. The audit trail can be particularly useful if a security breach does occur with respect to the resource associated with the multiple custody linkage. In particular, the audit trail can be referenced/analyzed to identify any information associated with the security breach. It should be appreciated that the audit trail can provide valuable information regardless of whether any security breaches occur. For example, the audit trail may be analyzed periodically for general auditing purposes to ensure proper protocols are followed by users when accessing the resource. The audit trail can be implemented in any appropriate form for storing information. For example, the audit trail may be implemented as a text file, a blockchain, a database associating timestamps to certain events, etc. In some embodiments, step 504 is performed by audit circuit 120.

The received information is monitored for abnormalities at step 506. Abnormalities can indicate that the resource may be experiencing a possible security threat. In some embodiments, to identify abnormalities in the received information, the received information can be compared against information gathered in previous multiple custody linkages to determine if the received information is similar to the previously gathered information. For example, if a duration of the multiple custody linkage indicated by the received information is twice as long as an average duration of the previous multiple custody linkages, an abnormality associated with the duration may be identified. In some embodiments, the received information is monitored by passing the received information to an AI model. In this case, the AI model can utilize the received information as input to determine if any abnormalities exist (and therefore if a possible threat to the resource exists). In some embodiments, step 506 is performed by interaction tracking circuit 122.

A determination of whether any abnormalities are detected is made at step 508. If abnormalities are detected (step 508, "YES"), process 500 may proceed to step 512. If no abnormalities are detected (step 508, "NO"), process 500 may proceed to step 510. In some embodiments, multiple abnormalities are required to be detected for process 500 to proceed to step 512. In some embodiments, the determination in step 508 is based on an estimated probability that security of the resource may be threatened. In this case, if the probability is above a threshold value, process 500 can proceed to step 512. If the probability is below the threshold value, process 500 can proceed to step 510. In some embodiments, step 508 is performed by interaction tracking circuit 122.

A determination of whether the multiple custody linkage is complete is made in step 510. If step 510 is performed, the resource associated with the multiple custody linkage may be determined to be secure. The determination made in step 510 may be based on various factors such as, for example, whether users involved in the multiple custody linkage need to perform additional interactions with the resource, whether an allotted amount of time for the multiple custody linkage has elapsed, etc. If the multiple custody linkage is determined to be incomplete (step 510, "NO"), process 500 can repeat starting at step 502. While the multiple custody linkage is incomplete, process 500 can continue to monitor the linkage until either the linkage naturally ends (e.g., the users involved in the linkage finish required interactions with the resource) or some abnormality is detected that indicates the linkage should prematurely end. If the linkage is determined to be complete (step 510, "YES"), process 500 can proceed to step 512. In some embodiments, step 510 is performed by interaction tracking circuit 122.

The multiple custody linkage is terminated in step 512. Terminating the multiple custody linkage may include various actions such as locking the resource and disabling a transient state of user devices involved in the multiple custody linkage. If step 512 is performed as a result of an abnormality being detected in step 508, terminating the linkage may further include initiating a security measure to ensure the resource is secure. In some embodiments, step 512 is performed by interaction tracking circuit 122.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
  a network interface; and
  a processing circuit comprising one or more processors coupled to non-transitory memory, wherein the processing circuit is structured to:
    receive a request for a multiple custody linkage between a plurality of user devices, the multiple custody linkage including a digital connection between the plurality of user devices that allows shared access to a resource, the resource comprising at least one of a physical object or information;
    perform a validation process based on information in the request for the multiple custody linkage to determine if a violation of a security protocol exists, the security protocol associated with security of the resource, the security protocol indicating a threshold distance between the plurality of user devices for a duration of the multiple custody linkage, which can be configured depending on a level of security desired for accessing a particular resource, and that if exceeded, would violate the security protocol; and in response to determining no violation of the security protocol exists, activate the multiple custody linkage between the plurality of user devices to allow the shared access to the resource.

2. The system of claim 1, wherein the processing circuit is further structured to deny the request in response to determining that the violation of the security protocol exists.

3. The system of claim 1, wherein the processing circuit is further structured to:

monitor information gathered during the multiple custody linkage to detect security protocol violations that occur during the multiple custody linkage; and in response to detecting at least one security protocol violation during the multiple custody linkage, initiate a security measure.

4. The system of claim 1, wherein activating the multiple custody linkage comprises setting the plurality of user devices in a transient state, the transient state indicating users associated with the plurality of user devices are authorized to access the resource.

5. The system of claim 1, wherein the security protocol comprises at least one of:

a protocol defining a period of time when the resource is accessible;

a protocol defining a list of individuals allowed to access the resource;

a protocol defining a maximum distance between the plurality of user devices and the resource; or a protocol defining one or more user credentials that must be verified.

6. The system of claim 1, wherein at least one of the plurality of user devices is a remote device, the remote device allowing a user to participate in the multiple custody linkage beyond a predefined distance from the resource.

7. The system of claim 1, wherein the multiple custody linkage is a dual custody linkage.

8. A computer-implemented method comprising:

receiving, by an institution computing system, a request for a multiple custody linkage between a plurality of user devices, the multiple custody linkage including a digital connection between the plurality of user devices that allows shared access to a resource, the resource comprising at least one of a physical object or information;

performing, by the institution computing system, a validation process based on information in the request for the multiple custody linkage to determine if a violation of a security protocol exists, the security protocol associated with security of the resource, the security protocol indicating a threshold distance between the plurality of user devices for a duration of the multiple custody linkage, which can be configured depending on a level of security desired for accessing a particular resource, and that if exceeded, would violate the security protocol; and in response to determining no violation of the security protocol exists, activating, by the institution computing system, the multiple custody linkage between the plurality of user devices to allow the shared access to the resource.

9. The method of claim 8, further comprising denying, by the institution computing system, the request in response to determining that the violation of the security protocol exists.

10. The method of claim 8, further comprising:

monitoring, by the institution computing system, information gathered during the multiple custody linkage to detect security protocol violations that occur during the multiple custody linkage; and in response to detecting at least one security protocol violation during the multiple custody linkage, initiating, by the institution computing system, a security measure.

11. The method of claim 8, wherein activating the multiple custody linkage comprises setting, by the institution computing system, the plurality of user devices in a transient state, the transient state indicating users associated with the plurality of user devices are authorized to access the resource.

12. The method of claim 8, wherein the security protocol comprises at least one of:

a protocol defining a period of time when the resource is accessible;

a protocol defining a list of individuals allowed to access the resource;

a protocol defining a maximum distance between the plurality of user devices and the resource; or a protocol defining one or more user credentials that must be verified.

13. The method of claim 8, wherein at least one of the plurality of user devices is a remote device, the remote device allowing a user to participate in the multiple custody linkage beyond a predefined distance from the resource.

14. The method of claim 8, wherein the multiple custody linkage is a dual custody linkage.

15. A computer-implemented method, comprising:

linking, by a first user device, the first user device with a second user device;

generating, by the first user device, a request for a multiple custody linkage between the first user device and the second user device, the multiple custody linkage including a digital connection between the first user device and the second user device that allows shared access to a resource, the resource comprising at least one of a physical object or information, the multiple custody linkage corresponding to a security protocol indicating a threshold distance between the first user device and the second uses device for a duration of the multiple custody linkage, which can be configured depending on a level of security desired for accessing a particular resource, and that if exceeded, would violate the security protocol;

transmitting, by the first user device, the request to an institution computing system;

receiving, by the first user device, a notification indicating whether the request is approved or denied.

16. The method of claim 15, further comprising setting, by the first user device, the first user device in a transient state responsive to the notification indicating the request is approved, the transient state indicating a user associated with the first user device is authorized to access a resource.

17. The method of claim 15, further comprising:

receiving, by the first user device, a confirmation request requesting a user associated with the first user device to confirm the multiple custody linkage; and providing, by the first user device, a response to the confirmation request to the institution computing system.

18. The method of claim 15, further comprising transmitting, by the first user device, a location of the first user device to the institution computing system, wherein the institution computing system determines if the first user device is within a predefined distance of the resource based on the location.

19. The method of claim 15, further comprising providing, by the first user device, a multiple custody application, the multiple custody application allowing a user to link the first user device and the second user device.

20. The method of claim 15, wherein the request comprises one or more user credentials stored by the first user device, the one or more user credentials used by the institution computing system to verify an identity of a user associated with the first user device.

* * * * *